US012743575B2

(12) United States Patent
Österlund

(10) Patent No.: US 12,743,575 B2
(45) Date of Patent: Sep. 22, 2026

(54) SYNCHRONIZING DOCUMENT OBJECT MODEL TREES RESPECTIVELY MAINTAINED BY A SERVER AND A BROWSER

(71) Applicant: Oracle International Corporation, Redwood Shores, CA (US)

(72) Inventor: Erik Österlund, Vasterhaninge (SE)

(73) Assignee: Oracle International Corporation, Redwood Shores, CA (US)

( * ) Notice: Subject to any disclaimer, the term of this patent is extended or adjusted under 35 U.S.C. 154(b) by 176 days.

(21) Appl. No.: 18/352,434

(22) Filed: Jul. 14, 2023

(65) Prior Publication Data

US 2025/0021743 A1 Jan. 16, 2025

(51) Int. Cl.
*G06F 40/14* (2020.01)
*G06F 16/93* (2019.01)
(Continued)

(52) U.S. Cl.
CPC .............. *G06F 40/14* (2020.01); *G06F 16/94* (2019.01); *G06F 16/958* (2019.01);
(Continued)

(58) Field of Classification Search
CPC ...... G06F 16/958; G06F 40/14; G06F 40/154; G06F 40/194
See application file for complete search history.

(56) References Cited

U.S. PATENT DOCUMENTS 5,371,499 A 12/1994 Graybill et al.
5,765,007 A 6/1998 Rahman et al.
(Continued)

FOREIGN PATENT DOCUMENTS

CA 2700217 C 7/2011
CN 117539478 A * 2/2024 .............. G06F 8/38
(Continued)

OTHER PUBLICATIONS

"Basic Graph Algorithms", Indian Computing Olympiad, Retrieved from https://www.iarcs.org.in/inoi/online-study-material/topics/graphs-dfs.php, Retrieved on Dec. 8, 2022, pp. 3.
(Continued)

*Primary Examiner* — Benjamin Smith
(74) *Attorney, Agent, or Firm* — Invoke

(57) ABSTRACT

A system synchronizes a server-side DOM tree and a browser-side DOM tree with one another. Server may receive from a browser, a hash value of the browser-side DOM tree, and a server-side update instruction for applying a first server-side update to the server-side DOM tree to synchronize with a first browser-side update by the browser to the browser-side DOM tree. The server may identify the server-side DOM tree based on the hash value. The server may execute upon the server-side DOM tree, the first server-side update and a second server-side update that is triggered by the first server-side update. The server may compute a browser-side update instruction for applying a second browser-side update to the browser-side DOM tree to synchronize with the server-side DOM tree. The server may transmit the browser-side update instruction to the browser, and the browser may apply the second browser-side update to the browser-side DOM tree.

33 Claims, 6 Drawing Sheets

(51) Int. Cl.
*G06F 16/958* (2019.01)
*G06F 40/154* (2020.01)
*G06F 40/194* (2020.01)
*G06F 40/197* (2020.01)

(52) U.S. Cl.
CPC .......... *G06F 40/154* (2020.01); *G06F 40/194* (2020.01); *G06F 40/197* (2020.01)

(56) References Cited

U.S. PATENT DOCUMENTS 5,787,430 A 7/1998 Doeringer et al.
5,842,016 A 11/1998 Toutonghi et al.
5,873,104 A 2/1999 Tremblay et al.
5,928,357 A 7/1999 Underwood et al.
5,933,840 A 8/1999 Menon et al.
5,974,421 A 10/1999 Krishnaswamy et al.
6,052,699 A 4/2000 Huelsbergen et al.
6,065,020 A 5/2000 Dussud
6,158,024 A 12/2000 Mandal
6,226,653 B1 5/2001 Alpern et al.
6,260,042 B1 * 7/2001 Curbera .............. G06F 16/9027
6,304,949 B1 10/2001 Houlsdworth
6,324,637 B1 11/2001 Hamilton
6,499,032 B1 12/2002 Tikkanen et al.
6,567,905 B2 5/2003 Otis
6,694,346 B1 2/2004 Aman et al.
6,728,732 B1 4/2004 Eatherton et al.
6,766,513 B2 7/2004 Charnell et al.
6,769,004 B2 7/2004 Barrett
6,809,792 B1 10/2004 Tehranchi et al.
6,915,296 B2 7/2005 Parson
7,072,905 B2 7/2006 Garthwaite
7,089,272 B1 8/2006 Garthwaite et al.
7,269,705 B1 9/2007 Seidl et al.
7,293,051 B1 11/2007 Printezis et al.
7,389,395 B1 6/2008 Garthwaite et al.
7,404,182 B1 7/2008 Garthwaite et al.
7,428,560 B1 9/2008 Detlefs et al.
7,523,081 B1 4/2009 Engebretsen
7,539,837 B1 5/2009 Flood et al.
7,546,587 B2 6/2009 Marr et al.
7,548,940 B2 6/2009 Bacon et al.
7,610,437 B2 10/2009 Sinclair et al.
7,774,389 B2 8/2010 Stephens et al.
7,808,929 B2 10/2010 Wong et al.
7,904,493 B2 3/2011 Schmelter et al.
7,962,707 B2 6/2011 Kaakani et al.
7,984,084 B2 7/2011 Sinclair
8,051,426 B2 11/2011 Meijer et al.
8,082,493 B2 * 12/2011 Sthanikam ............ G06F 40/194 715/234
8,261,269 B2 9/2012 Garmark
8,285,918 B2 10/2012 Maheshwari
8,381,094 B1 * 2/2013 Prasad .................... G06F 16/95 715/201
8,429,526 B2 * 4/2013 Sthanikam ............ G06F 40/194 715/255
8,443,263 B2 5/2013 Selinger et al.
8,495,093 B2 7/2013 Baudel
8,499,283 B2 * 7/2013 Mony ................. G06F 9/45512 717/124
8,539,338 B2 * 9/2013 Zhu ..................... H04L 67/1095 715/234
8,655,913 B1 * 2/2014 Shah ................... G06F 16/8373 707/780
8,688,754 B1 4/2014 Burka et al.
8,788,778 B1 7/2014 Boyle
8,825,719 B2 9/2014 Steensgaard et al.
8,825,721 B2 9/2014 Hunt et al.
8,856,186 B1 10/2014 Li et al.
8,873,284 B2 10/2014 Sinclair et al.
8,977,627 B1 3/2015 Vijayanarasimhan et al.
9,135,169 B2 9/2015 Kawachiya et al.
9,171,097 B2 * 10/2015 Ceze ................... G06F 16/9574
9,208,081 B1 12/2015 Dice et al.
9,223,693 B2 12/2015 Sinclair et al.
9,268,763 B1 * 2/2016 Esho ..................... G06F 40/143
9,305,169 B2 * 4/2016 Borohovski .......... G06F 16/951
9,323,608 B2 4/2016 Troia
9,330,191 B2 * 5/2016 Teevan .................... G06F 40/14
9,330,395 B2 * 5/2016 Hauser ............... G06Q 30/0201
9,336,133 B2 5/2016 Sinclair et al.
9,338,143 B2 * 5/2016 Hansen ................. G06F 21/125
9,348,746 B2 5/2016 Sinclair et al.
9,356,574 B2 * 5/2016 Denninghoff ......... G06F 16/954
9,374,385 B1 * 6/2016 Falkowitz ............ H04L 63/145
9,386,037 B1 * 7/2016 Hunt ................... H04L 63/1433
9,465,731 B2 10/2016 Sinclair et al.
9,503,435 B2 11/2016 Mizrahi et al.
9,578,048 B1 * 2/2017 Hunt ................... H04L 63/1416
9,652,382 B1 5/2017 Subramanian et al.
9,727,456 B2 8/2017 Malwankar et al.
9,734,050 B2 8/2017 Sinclair et al.
9,734,911 B2 8/2017 Sinclair et al.
9,740,716 B2 8/2017 Wilhelmsson
9,778,855 B2 10/2017 Sinclair
9,953,014 B1 * 4/2018 Reshadi .............. G06F 16/9574
9,971,683 B1 5/2018 Bell et al.
10,002,074 B2 6/2018 Flood et al.
10,084,779 B2 * 9/2018 Hunt ................... H04L 63/1416
10,108,543 B1 10/2018 Duggal et al.
10,108,544 B1 10/2018 Duggal et al.
10,120,613 B2 11/2018 Sinclair et al.
10,127,210 B1 * 11/2018 Karppanen ........... G06F 40/103
10,133,490 B2 11/2018 Sinclair et al.
10,146,749 B2 * 12/2018 Ayoub .................. G06F 16/972
10,146,752 B2 * 12/2018 Ciabarra, Jr. ......... G06F 16/986
10,255,179 B2 4/2019 Ji et al.
10,261,898 B1 4/2019 Payer
10,275,261 B1 4/2019 Anusuya Rangappa Lohith
10,318,592 B2 * 6/2019 Ciabarra, Jr. ......... G06F 16/986
10,331,651 B2 * 6/2019 Abadi .................. G06F 16/972
10,346,520 B2 * 7/2019 Hunt ..................... G06F 40/205
10,419,568 B2 * 9/2019 Rubtsov ................ H04L 67/565
10,430,279 B1 10/2019 Dittia et al.
10,452,758 B1 * 10/2019 Bhowmick ........... G06F 40/205
10,547,679 B1 * 1/2020 Burnett ................... H04L 67/10
10,592,587 B2 * 3/2020 Ciabarra, Jr. ......... G06F 40/123
10,664,391 B2 5/2020 Jang
10,666,708 B1 * 5/2020 Gavalas .................. H04L 67/06
10,726,091 B2 * 7/2020 Isager ................... G06F 16/958
10,739,996 B1 8/2020 Ebsen et al.
10,757,101 B2 * 8/2020 Hunt ..................... G06F 21/128
10,795,812 B1 10/2020 Duggal et al.
10,908,930 B2 * 2/2021 Yeh ..................... G06F 9/45529
10,929,288 B1 2/2021 Moore et al.
10,969,959 B2 * 4/2021 Somasundaram .... G06F 3/0605
10,983,715 B2 4/2021 Sharoni et al.
10,983,908 B1 4/2021 Zou et al.
10,986,182 B1 * 4/2021 Burnett ................... H04L 67/10
10,996,884 B2 5/2021 Danilov et al.
11,050,811 B2 * 6/2021 Mashaal ............... H04L 67/104
11,086,537 B2 8/2021 Byun
11,157,680 B1 * 10/2021 Lee ....................... G06F 40/197
11,165,822 B2 * 11/2021 Hunt ................... H04L 63/1433
11,194,885 B1 * 12/2021 Parhami .............. G06F 16/9577
11,201,892 B1 * 12/2021 Kashitsyn ........... H04L 63/1433
11,222,091 B2 * 1/2022 Liu .......................... G06F 8/71
11,228,611 B1 * 1/2022 John ....................... G06F 21/55
11,301,539 B2 * 4/2022 Macxis, Jr. ........... G06F 40/117
11,366,801 B1 6/2022 Kumar et al.
11,397,843 B1 * 7/2022 Lee ....................... G06F 40/186
11,445,003 B1 9/2022 Katta
11,507,503 B1 11/2022 Sterlund et al.
11,561,962 B2 * 1/2023 Abdoun .............. G06F 16/9566
11,573,894 B2 2/2023 Österlund et al.
11,601,460 B1 * 3/2023 Hunt ....................... G06F 40/14
12,197,324 B1 1/2025 Sterlund et al.
12,235,924 B2 * 2/2025 Esun .................. G06F 16/9577
2002/0059520 A1 5/2002 Murakami et al.
2003/0005027 A1 1/2003 Borman et al.
2003/0188141 A1 10/2003 Chaudhry et al.

(56) References Cited

U.S. PATENT DOCUMENTS

2004/0024812 A1* 2/2004 Park .................... G06F 16/972 715/201
2004/0186863 A1 9/2004 Garthwaite
2004/0187102 A1 9/2004 Garthwaite
2005/0066329 A1 3/2005 Fischer et al.
2005/0081190 A1 4/2005 Betancourt et al.
2005/0102670 A1 5/2005 Bretl et al.
2005/0114844 A1 5/2005 Betancourt et al.
2005/0149686 A1 7/2005 Bacon et al.
2005/0160413 A1 7/2005 Broussard et al.
2005/0160416 A1 7/2005 Jamison
2005/0188164 A1 8/2005 Ballantyne et al.
2005/0235006 A1 10/2005 Adl-Tabatabai et al.
2005/0267996 A1 12/2005 O'Connor et al.
2006/0005171 A1 1/2006 Ellison
2006/0026379 A1 2/2006 Jung
2006/0075123 A1 4/2006 Burr et al.
2006/0143168 A1 6/2006 Rossmann
2006/0143395 A1 6/2006 Zohar et al.
2007/0016633 A1 1/2007 Lindholm et al.
2007/0022149 A1 1/2007 Bacon et al.
2007/0033325 A1 2/2007 Sinclair
2007/0156777 A1 7/2007 Wolff et al.
2007/0162528 A1 7/2007 Wright et al.
2007/0203960 A1 8/2007 Guo
2007/0234005 A1 10/2007 Erlingsson et al.
2007/0240034 A1* 10/2007 Sthanikam ........... G06F 40/194 715/234
2007/0240035 A1* 10/2007 Sthanikam ........... G06F 40/194 715/234
2008/0034175 A1 2/2008 Traister et al.
2008/0082596 A1 4/2008 Gorobets
2008/0086619 A1 4/2008 Traister et al.
2008/0140737 A1 6/2008 Garst et al.
2008/0162787 A1 7/2008 Tomlin et al.
2008/0189477 A1 8/2008 Asano et al.
2008/0250213 A1 10/2008 Holt
2009/0007075 A1 1/2009 Edmark et al.
2009/0037660 A1 2/2009 Fairhurst
2009/0119352 A1 5/2009 Branda et al.
2009/0132622 A1 5/2009 Rossmann et al.
2009/0158288 A1 6/2009 Fulton et al.
2009/0307256 A1* 12/2009 Tiyyagura .............. G06F 16/81 707/999.102
2009/0307292 A1 12/2009 Li et al.
2009/0319720 A1 12/2009 Stefanus et al.
2009/0328007 A1 12/2009 Chen et al.
2010/0011357 A1 1/2010 Ramamurthy
2010/0070727 A1 3/2010 Harris et al.
2010/0082710 A1 4/2010 Kilner et al.
2010/0114998 A1 5/2010 Steensgaard et al.
2010/0217953 A1 8/2010 Beaman et al.
2010/0223429 A1 9/2010 Cher et al.
2010/0254254 A1 10/2010 Chan et al.
2010/0287028 A1* 11/2010 Hauser .............. G06Q 30/0201 705/7.29
2010/0287350 A1 11/2010 Ylonen
2010/0318892 A1* 12/2010 Teevan ................. G06F 16/958 715/229
2011/0145473 A1 6/2011 Maheshwari
2011/0145637 A1 6/2011 Gray et al.
2011/0161784 A1 6/2011 Selinger et al.
2011/0197177 A1* 8/2011 Mony ...................... G06F 8/51 717/115
2011/0208792 A1 8/2011 Printezis et al.
2011/0246543 A1 10/2011 Gracie et al.
2011/0252075 A1 10/2011 Ylonen et al.
2011/0252216 A1 10/2011 Ylonen et al.
2011/0258532 A1* 10/2011 Ceze .................. G06F 16/9574 715/234
2011/0273987 A1 11/2011 Schlansker et al.
2011/0286420 A1 11/2011 Cho et al.
2012/0203804 A1 8/2012 Burka et al.
2012/0260157 A1* 10/2012 Zhu .................... G06F 16/9574 709/213
2013/0054925 A1 2/2013 Hsia
2013/0073821 A1 3/2013 Flynn et al.
2013/0138703 A1 5/2013 Daynes et al.
2013/0227236 A1 8/2013 Flynn et al.
2013/0232402 A1* 9/2013 Lu ........................ G06F 40/143 719/318
2013/0290648 A1 10/2013 Shao et al.
2013/0318132 A1 11/2013 Basu et al.
2013/0326333 A1* 12/2013 Hashmi ................ G06F 16/958 715/234
2013/0332909 A1 12/2013 Odaira et al.
2014/0032922 A1 1/2014 Spilman
2014/0033213 A1 1/2014 Hudson et al.
2014/0101372 A1 4/2014 Jung et al.
2014/0108817 A1 4/2014 Chen et al.
2014/0173744 A1* 6/2014 Borohovski ........ H04L 63/1433 726/25
2014/0195818 A1 7/2014 Neumann et al.
2014/0278447 A1 9/2014 Unoki et al.
2014/0282872 A1* 9/2014 Hansen ................ H04L 63/102 726/3
2014/0283040 A1 9/2014 Wilkerson et al.
2014/0310235 A1 10/2014 Chan et al.
2014/0325148 A1 10/2014 Choi et al.
2014/0359201 A1 12/2014 Chakrabarti
2014/0365719 A1 12/2014 Kuzmin et al.
2015/0006843 A1 1/2015 Moser
2015/0026167 A1 1/2015 Neels et al.
2015/0058381 A1 2/2015 Wilhelmsson
2015/0081996 A1 3/2015 Flood
2015/0100752 A1 4/2015 Flood
2015/0193399 A1* 7/2015 Woker ................. H04L 41/082 715/234
2015/0193402 A1* 7/2015 Ayoub ................. G06F 40/143 715/234
2015/0227416 A1 8/2015 Reinart
2015/0227602 A1 8/2015 Ramu et al.
2015/0254219 A1* 9/2015 Harel ................... G06F 16/972 715/234
2015/0365941 A1 12/2015 Liu et al.
2015/0378870 A1 12/2015 Marron et al.
2016/0012280 A1 1/2016 Ito et al.
2016/0042015 A1 2/2016 Landau et al.
2016/0055230 A1 2/2016 Yurchenko et al.
2016/0092566 A1* 3/2016 Barouni Ebrahimi ...................... G06F 16/285 707/737
2016/0092591 A1* 3/2016 Barouni Ebrahimi ...................... G06F 16/2255 707/709
2016/0124802 A1 5/2016 Gabor et al.
2016/0134588 A1* 5/2016 Falkowitz .......... H04L 63/1441 726/11
2016/0134648 A1* 5/2016 Falkowitz .......... H04L 63/0227 726/23
2016/0163381 A1 6/2016 Lee
2016/0170649 A1 6/2016 Ramesh et al.
2016/0179580 A1 6/2016 Benedict
2016/0188548 A1* 6/2016 Ciabarra, Jr. ........ G06F 40/123 715/234
2016/0188651 A1* 6/2016 Abadi .................... G06F 16/84 707/691
2016/0239413 A1 8/2016 Stephens et al.
2016/0246713 A1 8/2016 Choi et al.
2016/0283369 A1 9/2016 Hada
2016/0350214 A1 12/2016 Payer et al.
2017/0006135 A1 1/2017 Siebel et al.
2017/0017650 A1* 1/2017 Ciabarra, Jr. ........ G06F 40/131
2017/0039242 A1 2/2017 Milton et al.
2017/0078286 A1* 3/2017 Hunt .................... G06F 21/128
2017/0078310 A1* 3/2017 Hunt ...................... H04L 63/20
2017/0091438 A1 3/2017 Raziel et al.
2017/0123655 A1 5/2017 Sinclair et al.
2017/0177168 A1 6/2017 Abudib et al.
2017/0177471 A1 6/2017 Frazier et al.
2017/0242790 A1 8/2017 O'Krafka et al.

(56) References Cited

U.S. PATENT DOCUMENTS

2017/0262364 A1 9/2017 Liden et al.
2017/0286544 A1* 10/2017 Hunt .................... H04L 63/123
2017/0289293 A1* 10/2017 Rubtsov ................ H04L 67/565
2017/0308513 A1* 10/2017 Hunt .................... G06F 40/205
2017/0344473 A1 11/2017 Gidra et al.
2018/0074854 A1 3/2018 Chan
2018/0095941 A1* 4/2018 Ciabarra, Jr. ......... G06F 40/143
2018/0173728 A1 6/2018 Munakata
2018/0189175 A1 7/2018 Ji et al.
2018/0276120 A1 9/2018 Vytiniotis et al.
2018/0329907 A1* 11/2018 De Paris ............. G06F 16/2379
2018/0335968 A1 11/2018 Pauley et al.
2018/0365106 A1 12/2018 Huang et al.
2019/0028473 A1* 1/2019 Hunt .................. H04L 63/1483
2019/0042406 A1 2/2019 Guniguntala et al.
2019/0042440 A1 2/2019 Kumar et al.
2019/0079906 A1* 3/2019 Karppanen ............ G06F 40/14
2019/0340212 A1* 11/2019 Isager .................. G06F 16/972
2020/0012600 A1 1/2020 Konoth et al.
2020/0012647 A1 1/2020 Johnson et al.
2020/0026781 A1 1/2020 Khot et al.
2020/0028697 A1 1/2020 Unger et al.
2020/0067862 A1 2/2020 Giralte
2020/0081748 A1 3/2020 Johnson et al.
2020/0089420 A1 3/2020 Sharoni et al.
2020/0099735 A1* 3/2020 Mashaal .............. H04N 21/234
2020/0125364 A1 4/2020 Erik
2020/0183584 A1* 6/2020 Somasundaram .... G06F 3/0605
2020/0192794 A1 6/2020 Lee
2020/0202127 A1 6/2020 Chen et al.
2020/0204587 A1* 6/2020 Hunt .................... G06F 21/128
2020/0218653 A1 7/2020 Ryu
2020/0250084 A1 8/2020 Stephens et al.
2020/0272681 A1* 8/2020 Macxis, Jr. ........... G06F 16/252
2020/0310686 A1 10/2020 Truong et al.
2020/0310963 A1 10/2020 Nilsen
2020/0327052 A1 10/2020 Nilsen
2020/0379902 A1 12/2020 Durham et al.
2021/0042398 A1 2/2021 Volluru
2021/0124608 A1 4/2021 Shveidel et al.
2021/0167963 A1 6/2021 Autry et al.
2021/0200546 A1 7/2021 Lemay et al.
2021/0278990 A1 9/2021 Choi
2021/0342362 A1 11/2021 Haravu et al.
2021/0406216 A1 12/2021 Komatsu et al.
2022/0027340 A1* 1/2022 Abdoun ................ G06F 16/958
2022/0058732 A1 2/2022 Reses
2022/0069995 A1 3/2022 Philipp
2022/0070205 A1* 3/2022 Kashitsyn ............... H04L 63/20
2022/0138098 A1 5/2022 Osterlund et al.
2022/0159032 A1* 5/2022 John ....................... H04L 63/10
2022/0188432 A1 6/2022 Turmel et al.
2022/0303289 A1* 9/2022 Townsend ............. G06F 16/955
2022/0345315 A1* 10/2022 Ilan ....................... H04L 9/0643
2022/0374353 A1 11/2022 Sterlund et al.
2023/0125593 A1 4/2023 Mahony et al.
2023/0409558 A1* 12/2023 Wysocki ............. G06F 16/2379
2024/0037164 A1* 2/2024 Wang .................... G06F 3/0482
2024/0039925 A1* 2/2024 Todasco .............. G06F 16/9027
2024/0160685 A1* 5/2024 Esun ................... G06F 16/9577
2024/0380783 A1* 11/2024 Tushkanov ......... H04L 63/1483

FOREIGN PATENT DOCUMENTS

JP 4265610 B2 5/2009
WO 00/29937 A2 5/2000
WO 2016/073019 A1 5/2016
WO 2017/053754 A1 3/2017
WO 2017/178114 A9 12/2017

OTHER PUBLICATIONS

"React as UI runtime", Overreacted, Feb. 2, 2019, pp. 38.

"Recitation 8—Dijkstra's Algorithm and DFS Numberings", Parallel and Sequential Data Structures and Algorithms, 15-210 (Fall 2013), Oct. 16, 2013, pp. 1-6.

"What is Schema?" Retrieved from https://github.com/json-schema-org/understanding-json-schema, Jan. 11, 2023, pp. 3.

Armbrust Michael Michael@Databricks Com et al, "Spark SQL Relational Data Processing in Spark," Proceedings of The 2015 ACM SIGMOD International Conference on Management of Data, SIGMOD '15, ACM Press, New York, New York, USA, May 27, 2015, pp. 1383-1394.

Ellis D., "What is Swagger? A beginner's guide", Jul. 26, 2022, pp. 6.

Verma A., "The comprehensive guide to react's virtual DOM", May 15, 2021, pp. 23.

Yang et al., "Deep Dive into ZGC: A Modern Garbage Collector in OpenJDK", ACM Transactions on Programming Language and Systems, ACM, New York, NY, 2022, vol. 44, No. 4, 34 Pages.

Yang et al., "Improving Program Locality in the GC using Hotness," PLDI' 20, pp. 301-313, Jun. 15-20, 2020.

Yuasa et al., "Return Barrier," International Lisp Conference, 2002, 12 pages.

Yuasa, T., "Real-time garbage collection on general-purpose machines," Journal of Systems and Software, vol. 11, Issue 3, <Mar. 1990, pp. 181-198.

ZGC Concurrent Class Unloading—Another Safepoint Operation Bites the Dust: available online at <http://cr.openjdk.java.net/~pliden/slides/ZGC-Jfokus-2019.pdf>, Feb. 4, 2019, 55 pages.

Zhao et al., "Low-latency, high-throughput garbage collection", PLDI 2022: Proceedings of the 43rd ACM SIGPLAN International Conference on Programming Language Design and Implementation, Jun. 2022, pp. 76-91.

"Lazy Compaction", Retrieved from https://wiki.se.oracle.com/display/JPG/Lazy+Compaction, Retrieved on Sep. 20, 2022, 2 Pages.

"ZGC—Generations Revision 2," accessed at https://wiki.se.oracle.com/display/JPG/ZGC+-+Generations+Revision , Feb. 1, 2020, pp. 6.

A concurrent, generational garbage collector for a multithreaded implementation of ML by Doligez (Year: 1993).

A Hardware Accelerator for Tracing Garbage Collection by Maas (Year: 2018).

Benjamin Zorn, Barrier Methods for Garbage Collection, Nov. 1990, UC Boulder available at: https://spl.cde.state.co.us/artemis/ucbserials/ucb51110internet/1990/ucb51110494internet.pdf (Year: 1990).

Boehm et al.; "Efficient In-Memory Indexing with Generalized Prefix Trees", downloaded from https://pdfs.semanticscholar.org/c5ca/a359fe6b345580a4dd476d5dd41a90bf301c.pdf; Mar. 26, 2018.

Click et al.; "The Pauseless GC Algorithm", VEE 05, Jun. 11-12, 2005, Chicago, Illinois, USA. Copyright 2005 ACM 1-59593-047-7/05/0006 . . . S5.00.

Clifford et al., "Memento Mori: Dynamic Allocation-Site-Based Optimizations", ACM SIGPLAN Notices, vol. 50, No. 11, Jun. 14, 2015, pp. 105-117.

David Gnedt, "Fast Profiling in the HotSpot Java VM with Incremental Stack Tracing and Partial Safepoints," Faculty of Engineering and Natural Sciences, 2014, 57 pages.

Detlefs; "Concurrent Remembered Set Refinement in Generational Garbage Collection", Proceedings of the USENIX Java VM '02 Conference, Aug. 1-2, 2002, San Francisco, CA.

Domani et al., "Implementing an On-the-fly Garbage Collector for Java," ACM SIGPLAN Notices, vol. 36, No. 1, 2000, pp. 155-166.

Dorai et al., Control delimiters and their hierarchies, LISP and Symbolic Computation: An International Journal, vol. 3, 1990, pp. 67-99.

Feng et al.; "Trie-join: a trie-based method for efficient string similarity joins", Published online Oct. 4, 2011; The VLDB Journal Springer-Verlag 2011.

Fitzgerald; "The Case for Profile Directed Selection of Garbage Collectors", Proceedings of the 2nd International Symposium on Memory Management, ACM, New York, NY USA, 111-120, DOI=10.1145/362422.362472, http://doi.acm.org/10.1145/362422.362472.

Generational Garbage Collection, Write Barriers/Write Protection and userfaultfd(2) by Cracauer (Year: 2016).

(56) References Cited

OTHER PUBLICATIONS

Getting started with Z Garbage Collector(ZGC) in Java 11 [Tutorial] by Davis (Year: 2019).
Goetz, Java theory and practice Garbage collection in the HotSpot JVM, Generational and concurrent garbage collection, IBM Developer Works, Nov. 25, 2003.
Harris T, et al., "Dynamic filtering: multi-purpose architecture support for language runtime systems," ACM SIGARCH Computer Architecture News, vol. 38, Issue 1, Mar. 2010, pp. 39-52.
Heule et al., "HyperLogLog in practice: algorithmic engineering of a state of the art cardinality estimation algorithm," EDBT '13: Proceedings of the 16th International Conference on Extending Database Technology, Mar. 2013, pp. 683-692.
Hosking; "A Comparative Performance Evaluation of Write Barrier Implementations", Proceedings ACM Conference on Object-Oriented Programming Systems, Languages and Applications, Vancouver, Canada, Oct. 1992, pp. 92-109.
How to Implement Java's hashCode Correctly, May 19, 2016, Available online at <https://www.sitepoint.com/how-to-implement-javas-hashcode-correctly/>, 7 pages.
JDK 15, Available online at < https://openjdk.java.net/projects/jdk/15/ >, Last updated, Sep. 15, 2020, 2 pages.
JEP 333: ZGC: A Scalable Low-Latency Garbage Collector(Experimental) by Liden and Karlsson (Year: 2020).
Joisha; "Sticky Tries: Fast Insertions, Fast Lookups, No Deletions for Large Key Universe", ISMM '14, Jun. 12, 2014, Edinburgh UK.
Kliot et al., "A Lock-Free, Concurrent, and Incremental Stack Scanning for Garbage Collectors," In Proceedings of the ACM SIGPLAN/SIGOPS International Conference on Virtual Execution Environments (VEE '09), 2009, pp. 11-20.
Lokesh Gupta, "Java Secure Hashing—MD5, SHA256, SHA512, PBKDF2, BCrypt, Scrypt," Available online at <https://howtodoinjava.com/security/how-to-generate-secure-password-hash-md5-sha-pbkdf2-bcrypt-examples/> printed on Apr. 14, 2020, 38 pages.
M. Felleisen et al., Beyond Continuations: Technical Report No. 216, Feb. 1987, 13 pages.
Main—Main—OpenJDK Wiki, Created by Iris Clark, last modified by Per Liden, available online at <URL: https://wiki.openjdk.java.net/display/zgc/Main>, Oct. 15, 2020, 9 pages.
Mohamed A. El-Zawawy, "Recognition of Logically Related Regions Based Heap Abstraction", Journal of the Egyptian Mathematical Society, vol. 20, Issue 2, Jul. 2012, pp. 64-71, arXiv:1212.5094 [cs.LO].
Mostly Concurrent Garbage Collection Revisited by Barabash (Year: 2003).
Olsson et al.; "Trash a dynamic LC-trie and hash data structure", Trita-CSC-TCS 2006:2, ISRN/KTH/CSC/CS-2006/2-SE, ISSN 1653-7092, Aug. 18, 2006.
Open JDK, "HotSpot Glossary of Terms", 2006, Sun Microsystems, available at <https://openjdk.java.net/groups/hotspot/docs/HotSpotGlossary.html>, 6 pages.
Osterlund E., "Garbage Collection supporting automatic JIT parallelization in JVM", Computer Science, Jun. 26, 2012, pp. 29.
Osterlund E., "Going Beyond On-The-Fly Garbage Collection and Improving Self-Adaptation with Enhanced Interfaces", Computer Science, 2019, pp. 68.
Osterlund et al., "Block-Free Concurrent GC: Stack Scanning and Copying," International Symposium on Memory Management, vol. 51, 2016, 12 pages.
Per Liden, The Design of ZGC—A scalable Low-Latency Garbage Collector for Java: available online at <http://cr.openjdk.java.net/~pliden/slides/ZGC-PLMeetup-2019.pdf>, Jun. 12, 2019, 84 pages.
Pufek et al., "Analysis of Garbage Collection Algorithms and Memory Management in Java", 2019 42nd International Convention on Information and Communication Technology, Electronics and Microelectronics (Mipro), Croatian Society Mipro, May 20, 2019, pp. 1677-1682.
Robbin Ehn, "JEP 312: Thread-Local Handshakes," Hotspot Dash Dev at Openjdk Dot Java Dot Net, available at <http://openjdk.java.net/jeps/312>, 2018, 3 pages.
Rogers I., "Reducing and eliding read barriers for concurrent garbage collectors," ICOOOLPS '11: Proceedings of the 6th Workshop on Implementation, Compilation, Optimization of Object-Oriented Languages, Programs and Systems, Jul. 2011, Article No. 5, pp. 1-5.
Ryan Sciampacone et al., "Garbage collection in WebSphere Application Server V8, Part 2: Balanced garbage collection as a new option", IBM developerWorks, Aug. 3, 2011.
Saxena et al., "Key and Value Paired Data using Java Hash Table," International Journal of Engineering and Management Research, vol. 4, Issue 1, Feb. 2014, pp. 81-89.
Stefan Karlsson, JEP 439: Generational ZGC, Aug. 25, 2021, OpenJDK, available at: https://openjdk.org/jeps/439 (Year: 2021).
Tene et al.; C4: The Continuously Concurrent Compacting Collector ISMM'11, Jun. 4-5, 2011, San Jose, CA, USA Copyright 2011, ACM 978-M503-0263-0/11/06 . . . $10.00.
The Z Garbage Collector—Low Latency GC OpenJDK, available online at <http://cr.openjdk.java.net/~pliden/slides/ZGC-Jfokus-2018.pdf>, 2018, 96 pages.
Title: Detecting and eliminating memory leaks using cyclic memory allocation, author: JJ Nguyen et al., published on 2007.
Title: Reconsidering custom memory allocation; author :: ED Berger et al., published on 2002.
Title: Understanding memory allocation of Scheme programs author: M Serrano published on 2000.
Vechev et al. "Write Barrier Elision for Concurrent Garbage Collectors", 2004 (Year: 2004).
Wilson, P. R., et al., "A "Card-making" scheme for controlling intergenerational differences in generation—based garbage collection on stock hardware," ACM SIGPLAN Notices, vol. 24, Issue 5, May 1989, pp. 87-92.
Write Barrier Elision for Concurrent Garbage Collectors by Vechev (Year: 2004).
Geeksforgeeks, "Thread in Operating System", Aug. 16, 2019, pp. 1-4, https://web.archive.org/web/20200926013500/https://www.geeksforgeeks.org/thread-in-operating-system/ (Year: 2019).
Guy Harris, "Thread (computing)", Dec. 2022, pp. 1-10, https://en.wikipedia.org/w/index.php?title=Thread_ (computing)&oldid=1128791380 (Year: 2022).
Stephen J. Bigelow, "thread", Aug. 2023, pp. 1-10, https://www.techtarget.com/whatis/definition/thread (Year: 2023).
Sun Microsystems, "What Is a Thread?", 2005, pp. 1-2, https://www.iitk.ac.in/esc101/05Aug/tutorial/essential/threads/definition.html#:~: text=Definition:%20A%20thread%20is%20a,tasks%20in%20a%20single%20program. (Year: 2005).
Pekka, "Barrier techniques for incremental tracing" chrome-extension://efaidnbmnnnibpcajpcglclefindmkaj/https://dl.acm.org/doi/pdf/10.1145/301589.286863, 1998, (Year: 1998).
Anderson: "Optimizations in a private nursery-based private nursery-based garbage collector", Acm Sigplan Notices, vol. 45, No. 8, Jun. 5, 2010, pp. 21-30.
Kalibera, "Replicating real-time garbage collector for Java", Java Technologies For Real-Time and Embedded Systems, Sep. 23, 2009, pp. 100-109.
Maruyama et al., "Digest Values for DOM (DOMHASH)", RFC 2803, Apr. 2000, XP015029259, pp. 1-11.
R. Barber G. Lohman, Memory-Efficient Hash Joins. (Year: 2014).
John Kelsey, Cryptanalytic Attacks on Pseudorandom Number Generators. (Year: 1998).

* cited by examiner

SYNCHRONIZING DOCUMENT OBJECT MODEL TREES RESPECTIVELY MAINTAINED BY A SERVER AND A BROWSER

TECHNICAL FIELD

The present disclosure relates to synchronization of content between a server and a browser. More particularly, the present disclosure relates to the use of document object model (DOM) trees to synchronize content between a server and a browser.

BACKGROUND

DOM trees may be utilized to represent data, such as content for a web page, in a tree structure in which each node is an object representing a portion of the data. For example, elements of an HTML or XML document may be represented as nodes in a DOM tree. The content of the document represented by the DOM tree may be changed by programmatically accessing the DOM tree and changing various nodes of the DOM tree to reflect the desired changes. For example, nodes of the DOM tree may be added, removed, or relocated. Additionally, or in the alternative, the content represented by nodes of the DOM tree may be changed.

The content of this background section should not be construed as prior art merely by virtue of its presence in this section.

BRIEF DESCRIPTION OF THE DRAWINGS

The embodiments are shown by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
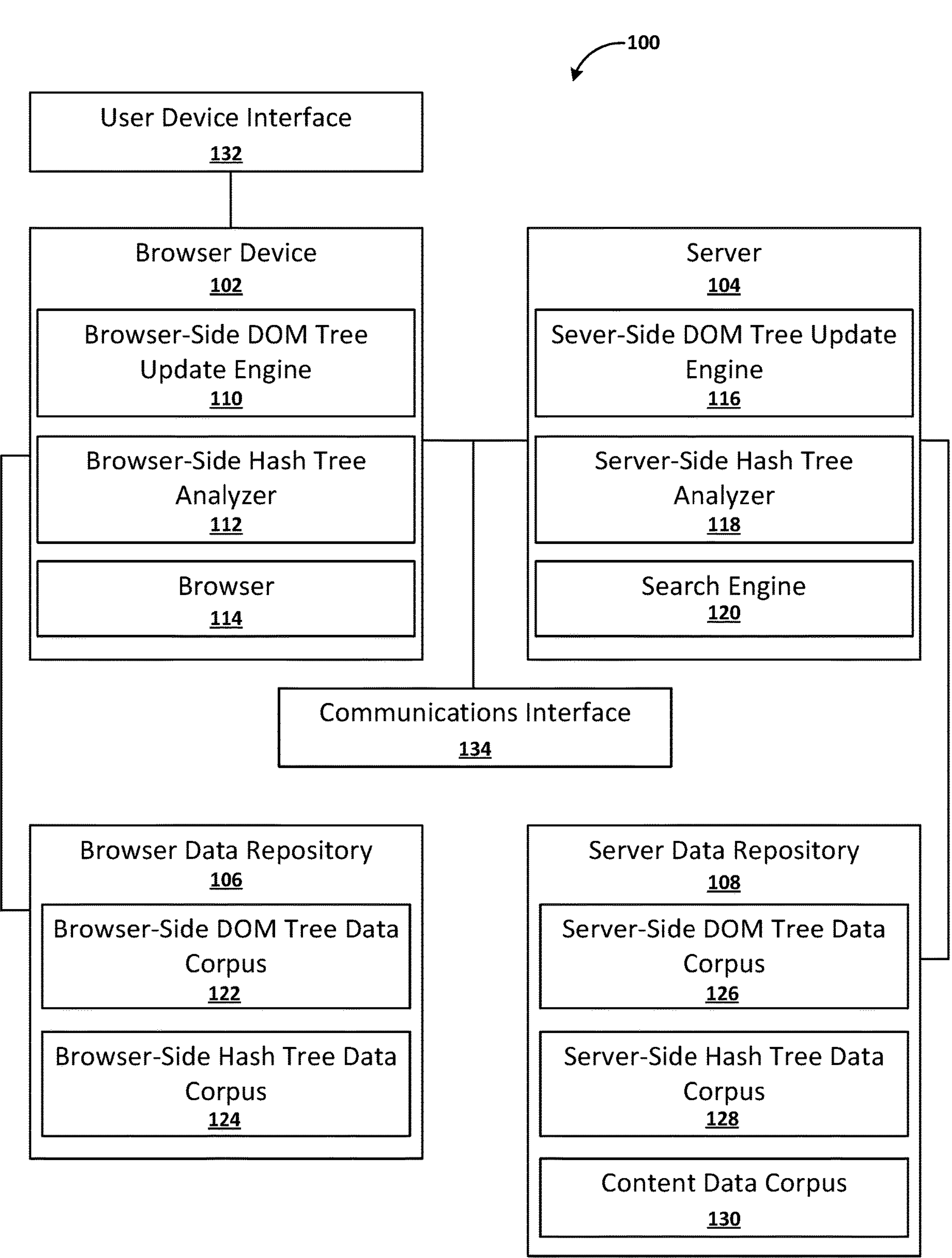
FIG. 1 illustrates an example system for synchronizing DOM trees respectively maintained by a server and a browser, in accordance with one or more embodiments.

In the following description, for the purposes of explanation, numerous specific details are set forth in order to provide a thorough understanding. Detailed examples are described below for purposes of clarity. One or more embodiments may be practiced without these specific details. Components and/or operations described below should be understood as one specific example which may not be applicable to certain embodiments. Features described in one embodiment may be combined with features described in a different embodiment. In some examples, well-known structures and devices are described with reference to a block diagram form in order to avoid unnecessarily obscuring the present invention. Components and/or operations described below should not be construed as limiting the scope of any of the claims.

1. GENERAL OVERVIEW
2. EXAMPLE DOM TREE MANAGEMENT SYSTEM
3. EXAMPLE DOM TREE MANAGEMENT OPERATIONS
4. COMPUTER NETWORKS AND CLOUD NETWORKS
5. MICROSERVICE APPLICATIONS
6. HARDWARE OVERVIEW
7. MISCELLANEOUS; EXTENSIONS

1. GENERAL OVERVIEW

One or more embodiments synchronize DOM trees respectively maintained by a server and a browser, for a same web page, using hash values to identify the DOM trees. The browser and server exchange information and updates for corresponding DOM trees using hash values that represent the DOM trees. For example, when a browser transmits a DOM tree update to a server, the browser transmits a hash value of the browser-side DOM tree being updated. The server identifies the corresponding server-side DOM tree based on the hash value received from the browser and performs the same update that was performed by the browser. Transmitting the update may include, for example, transmitting an instruction for specifying a modification for the DOM tree.

One or more embodiments identify differences between different versions of a DOM tree using hash trees that represent the different versions of the DOM tree. In an example, each version of a DOM tree is represented by a hash tree. The nodes of a DOM tree may be represented by hash values of a hash tree. The hash values at each level of the hash tree are used to compute the hash values at higher levels of the hash tree until a root hash value is computed for the hash tree. A system (e.g., a server or a browser) identifies differing sections of different versions of a DOM tree based on the corresponding hash trees. For example, the system may traverse a pair of hash trees, corresponding to the different versions of a DOM tree. When the system identifies a corresponding pair of hash values from the hash trees that are identical, the system does not traverse further down the children nodes of the nodes represented by the identical hash values. When the system identifies a pair of hash values from the hash trees that are different, the server traverses down until the identification of differing hash values that correspond to leaf nodes of the hash trees. The portion of the DOM trees represented by the leaf nodes are identified as being different.

One or more embodiments improve technology associated with the use of DOM trees to track and synchronize updates between a browser and a server. For example, by using root hash values to identify the respective copies of the DOM trees, the correct DOM tree to be updated can be identified with improved accuracy. Additionally, because, the root hash values of the respective hash trees match one another when the corresponding copies of the DOM tree are synchronized, the use of root hash values to identify the DOM tree to be updated provides implicit confirmation that the copies of the DOM tree are synchronized with one another as each update is applied to the respective DOM tree. Further, because a state of the DOM tree is maintained by the browser, the browser can efficiently revert back to a prior version of the DOM tree, for example, in response to a user input selecting a "back" button.

This General Overview section is intended to provide a general overview without addressing all aspects of the present disclosure. The full scope of the presently disclosed subject matter is understood from the content of the present disclosure in its entirety.

2. EXAMPLE DOM TREE MANAGEMENT SYSTEM

Referring now to FIG. 1, example systems are described. An example system may be utilized to perform operations associated with synchronizing DOM trees respectively maintained by a server and a browser.

A. Example System Components.

As shown in FIG. 1, a system 100 in accordance with one or more embodiments may include a browser device 102 and a server 104. The browser device 102 may be a client device. Additionally, or in the alternative, the browser device may be an end-user's computing device that executes a browser to view a web page. The system 100 may further include a browser data repository 106 associated with the browser device 102, and a server data repository 108 associated with the server 104. The browser data repository 106 may define a portion of the browser device 102. Additionally, or in the alternative, the browser data repository 106 may be communicatively coupled to the browser device 102 via a direct connection or via a network. The server data repository 108 may define a portion of the server 104. Additionally, or in the alternative, the server data repository 108 may be communicatively coupled to the server 104 via a direct connection or via a network.

The system 100 may utilize hash trees to determine an update that has been made to a DOM tree, such as an update to a server-side DOM tree and/or an update to a browser-side DOM tree. The system 100 may compute a first hash tree representing a DOM tree prior to an update, and a second hash tree representing the DOM tree subsequent to the update. As a result of the update, a first hash value representing the first hash tree will differ from a second hash value representing the second hash tree. Further, the system 100 may trace the difference between the first hash value and the second hash value to a particular node or nodes in the hash tree that differ as a result of the update. From these particular nodes of the hash tree, the system 100 may identify the corresponding nodes of the DOM tree that changed as a result of the update. The system 100 may perform this process to identify an update to a browser-side DOM tree and/or to identify an update to a server-side DOM tree. Further, upon having identified an update to a first DOM tree based on a corresponding first hash tree, the system 100 may generate an update instruction that includes one or more operations to be executed on a second DOM tree to synchronize the second DOM tree with the first DOM tree.

In one example, the browser 114 executing on the browser device 102 may identify a browser-side update to a browser-side DOM tree based on a comparison of browser-side hash trees representing the browser-side DOM tree before and after the update, respectively. The browser 114 may generate a server-side update instruction. The browser 114 may send the server-side update instruction to the server 104, and the server may execute the server-side update instruction to apply a server-side update to a server-side DOM tree corresponding to the browser-side DOM tree. As a result of the server-side update, the server-side DOM tree may be synchronous with the browser-side DOM tree reflecting the browser-side update.

Additionally, or in the alternative, the server 104 may identify a server-side update to a server-side DOM tree based on a comparison of server-side hash trees representing the server-side Dom tree before and after the server-side update, respectively. The server 104 may generate a browser-side update instruction. The server 104 may send the browser-side update instruction to the browser 114 executing on the browser device 102, and the browser 114 may execute the browser-side update instruction to apply a browser-side update to a browser-side DOM tree corresponding to the server-side DOM tree. As a result of the browser-side update, the browser-side DOM tree may be synchronous with the server-side DOM tree reflecting the server-side update.

The browser device 102 may include a browser-side DOM tree update engine 110 and a browser-side hash tree analyzer 112. The browser device 102 may further include a browser 114. The browser 114 may be configured to display content, such as web pages on a user device interface. Additionally, the browser 114 may synchronize browser-side DOM trees with corresponding server-side DOM trees at least by executing operations associated with the browser-side DOM tree update engine 110 and/or the browser-side hash tree analyzer 112. The browser-side DOM tree update engine 110 may be configured to execute operations associated with one or more browser-side DOM trees. The browser-side hash tree analyzer 112 may be configured to execute operations associated with one or more browser-side hash trees.

The browser-side DOM tree update engine 110 may generate and/or update one or more browser-side DOM trees from time to time. The browser-side DOM tree update engine 110 may generate an initial version of a browser-side DOM tree. The initial version of the browser-side DOM tree may represent content, such as a web page, that may be provided for display by the browser 114 on a user interface device. In one example, the content, such as the web page, may be transmitted to the browser device 102 by the server 104.

The browser-side DOM tree update engine 110 may update the browser-side DOM tree, for example, in response to a browser event associated with content represented by the browser-side DOM tree. The browser-side DOM tree update engine 110 may send an update instruction to the server 104, for example, in response to a browser event, and the server 104 may update the server-side DOM tree in response to the update instruction from the browser. Additionally, or in the alternative, the browser-side DOM tree update engine 110 may update the browser-side DOM tree in response to an update instruction from the server 104.

The browser-side hash tree analyzer 112 may generate and/or analyze one or more browser-side hash trees from time to time. The browser-side hash tree analyzer 112 may generate an initial version of a browser-side hash tree. The initial version of the browser-side hash tree may represent an initial version of a browser-side DOM tree. The browser-side hash tree analyzer 112 may generate an updated browser-side hash tree, for example, to represent an updated browser-side DOM tree. Additionally, or in the alternative, the browser-side hash tree analyzer 112 may determine an update to a browser-side DOM tree, for example, by comparing a first browser-side hash tree representing the browser-side DOM tree prior to the update to a second browser-side hash tree representing the browser-side DOM tree subsequent to the update.

The server 104 may include a server-side DOM tree update engine 116 and a server-side hash tree analyzer 118. The server 104 may synchronize server-side DOM trees with corresponding browser-side DOM trees at least by executing operations associated with the server-side DOM tree update engine 116 and/or the server-side hash tree analyzer 118. The server 104 may further include a search engine 120. The search engine 120 may be configured to execute search operations, for example in response to search queries received from the browser 114. The server 104 may execute operations associated with the server-side DOM tree update engine 116 and/or the server-side hash tree analyzer 118, for example, in connection with search queries received from the browser 114. The server-side DOM tree update engine 116 may be configured to execute operations associated with one or more server-side DOM trees. The server-side hash tree analyzer 118 may be configured to execute operations associated with one or more server-side hash trees.

The server-side DOM tree update engine 116 may generate and/or update one or more server-side DOM trees from time to time. The server-side DOM tree update engine 116 may generate an initial version of a server-side DOM tree. The initial version of the server-side DOM tree may match an initial version of a browser-side DOM tree generated by the browser 114. For example, the server 104 may send content, such as a web page, to the browser 114, and in connection with sending the content to the browser 114, the server 104 may generate the initial version of the server-side DOM tree and the browser 114 may generate the initial version of the browser-side DOM tree.

The server-side DOM tree update engine 116 may update the server-side DOM tree, for example, in response to an update instruction from the browser 114. Additionally, or in the alternative, server-side DOM tree update engine 116 may update the server-side DOM tree in response to a server event associated with content represented by the server-side DOM tree. Additionally, or in the alternative, the server-side DOM tree update engine 116 may send an update instruction to the browser 114, for example, in response to a server event, and the browser-side DOM tree update engine 110 may update the browser-side DOM tree in response to the update instruction from the server 104.

The server-side hash tree analyzer 118 may generate and/or analyze one or more server-side hash trees from time to time. The server-side hash tree analyzer 118 may generate an initial version of a server-side hash tree. The initial version of the server-side hash tree may represent an initial version of a server-side DOM tree. The server-side hash tree analyzer 118 may generate an updated server-side hash tree, for example, to represent an updated server-side DOM tree. Additionally, or in the alternative, the server-side hash tree analyzer 118 may determine an update to a server-side DOM tree, for example, by comparing a first server-side hash tree representing the server-side DOM tree prior to the update to a second server-side hash tree representing the server-side DOM tree subsequent to the update.

B. Example Events Triggering DOM Tree Updates.

The browser 114 browser executing on the browser device 102 may update a browser-side DOM tree in response to a browser event and may send a server-side update instruction to the server 104 so that the server 104 may synchronize a corresponding server-side DOM tree with the browser-side DOM tree reflecting the browser event. Additionally, or in the alternative, the server 104 may update a server-side DOM tree in response to a server event and may send a browser-side update instruction to the browser 114 so that the browser 114 may synchronize a corresponding browser-side DOM tree with the server-side DOM tree reflecting the server event. In one example, an update by the server 104 to a server-side DOM tree in response to a server-side update instruction may trigger a server event, resulting in a subsequent update to the server-side DOM tree and a corresponding browser-side update instruction being sent from the server 104 to the browser 114. Additionally, or in the alternative, an update by the browser 114 to a browser-side DOM tree in response to a browser-side update instruction may trigger a browser event, resulting in a subsequent update to the browser-side DOM tree and a corresponding server-side update instruction being sent from the browser 114 to the server 104.

In one example, a browser event may represent a user interaction with content, such as a web page, represented by a browser-side DOM tree and displayed by the browser 114 on a user device interface. For example, the user interaction may include at least one of: activation of a text box, typing in a text box, entering a search query, clicking a button, clicking a hyperlink, creating a bookmark, refreshing a page, interacting with streaming content, scrolling content, expanding content, collapsing content, opening a tab, closing a tab, opening a window, closing a window, resizing content, changing a browser setting, loading a file, closing a file, streaming video content, streaming audio content, changing a browser setting, blocking pop-ups, allowing pop-ups, or viewing a page source, as well as combinations of these. Additionally, or in the alternative, the user interaction may include clicking a back button, clicking a forward button, or clicking a "load more" button. In one example, a button, such as a "load more" button, may be configured to cause the browser to load and/or display additional content, such as curated content. Example curated content may include search results, a photo gallery, a video gallery, an audio gallery, an online shopping gallery, as well as combinations of these. In one example, interacting with streaming content may include clicking a play button, clicking a pause button, clicking a stop button, or skipping forward or backward on a progress bar.

In one example, the server event may represent a change in content available to the browser. For example, the server event may include at least one of: a search result event, a content update event, a data refresh event, a notification event, a media event, a scroll event, a form submission event, a time-based event, a geolocation event, or an error event, as well as combinations of these.

A search result event may include the server obtaining search results. The search results may include web pages, URLs, text, images, videos, or files, as well as combinations of these. In one example, a search result event may be triggered by a browser event, such as a query.

A content update event may include updated content becoming available. For example, updated content may become available when the server 104 dynamically fetches content. In one example, the server 104 may dynamically fetch content such as image files, video files, and/or audio files. Additionally, or in the alternative, the server 104 may dynamically fetch content such as items for display in an online store and/or an online shopping cart. The server 104 may dynamically fetch the content using at least one of: AJAX (Asynchronous JavaScript and XML), Fetch API, Axios, WebSocket, Server-Sent Events (SSE), GraphQL, or WebRTC.

A data refresh event may include content being periodically updated or refreshed. In one example, a data refresh update event may include updating at least one of: news feed data, a social media feed data, a message thread data, stock price data, financial data, e-commerce product data, ledger transaction data, sports score data, streaming data, live event data, webinar data, vehicle traffic data, flight schedule data, weather data, auction platform data, project management data, online gaming data, or time-dependent data.

A notification event may include a notification being provided to a user, for example, via a web page. The notification may pertain to a content update event or a data refresh event. In one example, a notification event may pertain to at least one of: a new messages in a messaging application, product availability in an online store, discounts in an online store, or new media in a multimedia platform.

A media streaming event may include providing streaming content, such as audio or video content. A media streaming event may be triggered by a browser playing streaming content on a web page. A media event may include at least one of: initiating streaming content, stopping streaming content, pausing streaming content, ending streaming content, updating a progress bar, or updating time data. A scroll event may occur responsive to an indication of scrolling a scrollbar associated with a web page. A scroll event may include dynamically fetching additional content, such as content associated with a feed, a gallery, or search results.

A form submission event may be triggered responsive to a user having submitted a form on a web page. The form submission event may include at least one of: processing data associated with the form, updating content, performing a search, or providing search results.

A time-based event may be triggered responsive to a specific time interval or schedule. As examples, a time-based event may include at least one of: updating content based on a time interval or schedule, or updating a timestamp. Additionally, or in the alternative, a time-based event may include fetching time-dependent data corresponding to a time, a time interval, or a schedule.

A geolocation event may occur in relation to geolocation tracking. In one example, a geolocation event may include updating content responsive to geolocation data, such as to customize and display location-specific content or services.

An error event may be triggered responsive to an error associated with fetching content, such as a broken image or a failed API request. An error event may include providing an error message or fallback content.

C. Example Hash Trees.

A hash tree, such as a browser-side hash tree or a server-side hash tree, may include a tree of nodes in which each node is associated with a hash value that uniquely represents the contents of the node and the position of the node within the tree. A hash tree may include leaf nodes, intermediate nodes, and a root node.

Each leaf node may represent an individual data block or element in the hash tree. The data associated with a leaf node may be hashed using a hash function resulting in a hash value that uniquely represents the data associated with the leaf node. Each leaf node may be assigned a unique label or identifier number based on its position in the hash tree. The unique label or identifier may include an index number and/or a more complex identifier derived, for example, from the data represented by the leaf node.

The intermediate nodes of a hash tree represent intermediate levels of the hash tree. A hash tree may include multiple layers of intermediate nodes. Each intermediate node may be associated with an intermediate hash value that is computed based on a concatenation or hashing of the hash values of its child nodes, which may include one or more leaf nodes and/or one or more lower-layer intermediate nodes. Each intermediate node may also be assigned a unique label or identifier number based on its position in the hash tree. The unique label or identifier assigned to an intermediate node may include an index number and/or a more complex identifier derived, for example, from the data represented by the child nodes associated with the intermediate node.

The root node of the hash tree represents the entire data structure. The root node may be associated with a root hash value computed based on a concatenation or hashing of the hash values of its child nodes, which may include one or more leave nodes and/or one or more intermediate nodes. The root hash value uniquely represents the entirety of the data structure associated with the hash tree. The root node may also be assigned a unique label or identifier number based on its position in the hash tree. The unique label or identifier assigned to the root node may include an index number and/or a more complex identifier derived, for example, from the data represented by the child nodes associated with the root node.

The nodes of a hash tree may be determined through the use of a hash function, such as a cryptographic hash function or a non-cryptographic hash function. A hash function may be selected based on one or more of the following properties: determinism, irreversibility, or avalanche effect. Determinism refers to the same input producing the same hash value. Irreversibility refers to difficulty in deriving an original input from the hash value. Avalanche effect refers to small changes in an input resulting in significant changes in the hash value. An example hash function may include a cryptographic hash function, such as an SHA-256 hash function, a RIPEMED hash function, a Whirlpool hash function, a Tiger hash function, a SipHash function, a BLAKE2 hash function, or an SHA3 (e.g., SHA3-256) hash function. By way of illustration, an SHA-256 or an SHA3-256 hash function may transform an input into a 256-bit output. Additionally, or in the alternative, an example hash function may include a non-cryptographic hash function, such as a MurmurHash hash function, a CityHash hash function, an xxHash hash function, a Fowler-Noll-Vo hash function, or a CRC32 hash function. A non-cryptographic hash function that may be particularly suitable for use in hash tables or hash-based data structures.

A browser-side hash tree may be computed for a browser-side DOM tree. The browser-side hash tree may include a browser-side root node, a plurality of browser-side intermediate nodes, and a plurality of browser-side leaf nodes. Each node in the browser-side hash tree may include a hash tree-node that represents a corresponding DOM tree-node of the browser-side DOM tree. For example, each browser-side leaf node may include a browser-side leaf hash value that represents a corresponding leaf node of the browser-side DOM tree. The browser-side hash tree may include a browser-side root hash value corresponding to a browser-side root node. The browser-side root hash value may be selected as a browser-side hash value utilized to identify the browser-side hash tree and/or the browser-side DOM tree in the browser data repository 106. For example, the browser hash value may be stored in the browser-side DOM tree data corpus 122 in association with the corresponding browser-side DOM tree. Additionally, or in the alternative, the browser hash value may be stored in the browser-side hash tree data corpus 124 in association with the corresponding browser-side hash tree.

A server-side hash tree may be computed for a server-side DOM tree. The server-side hash tree may include a server-side root node, a plurality of server-side intermediate nodes, and a plurality of server-side leaf nodes. Each node in the server-side hash tree may include a hash tree-node that represents a corresponding DOM tree-node of the server-side DOM tree. For example, each server-side leaf node may include a server-side leaf hash value that represents a corresponding leaf node of the server-side DOM tree. The server-side hash tree may include a server-side root hash value corresponding to a server-side root node. The server-side root hash value may be selected as a server-side hash value utilized to identify the server-side hash tree and/or the server-side DOM tree in the server data repository 108. For example, the server hash value may be stored in the server-side DOM tree data corpus 126 in association with the corresponding server-side DOM tree. Additionally, or in the alternative, the server hash value may be stored in the server-side hash tree data corpus 128 in association with the corresponding server-side hash tree.

D. Node Numbering Conventions.

In one example, the nodes of a hash tree, such as a browser-side hash tree and/or a server-side hash tree, may be numbered and/or renumbered according to a numbering convention. For example, the unique labels or identifiers of the nodes of a hash tree may be replaced with a node identification number determined according to the numbering convention. Additionally, or in the alternative, the node identification number for a node may be associated with, or appended to, the unique label or identifier of the node. The use of the numbering convention to assign node identification numbers to the nodes of a hash tree may assure that identity of the nodes of the hash tree is preserved from one hash tree to the next. In one example, a hash tree may be generated, and the nodes of the hash tree may be numbered and/or renumbered according to the numbering convention, after each update to a corresponding DOM tree. Additionally, or int eh alternative, the nodes of a DOM tree may be numbered and/or renumbered according to the numbering convention after each update to the DOM tree.

The node identification numbers resulting from the numbering and/or renumbering of a hash tree may be utilized, at least in part, to identify an update to a DOM tree corresponding to the hash tree. For example, if a node is deleted from a DOM tree or moved to a different location in the DOM tree, the deletion or moving of the node may be identified in the corresponding hash tree based at least in part on the node identification number. For example, if a leaf node is moved from position A to position B beneath an intermediate node, the data represented by the leaf node may still produce the same hash value, but the identification number of the node would change as a result of the move from position A to position B.

Additionally, or in the alternative, the node identification numbers resulting from the numbering and/or renumbering of a hash tree may be utilized, at least in part, to confirm that a browser-side DOM tree and a server-side DOM tree are synchronous or asynchronous with respect to one another. For example, if a browser-side hash tree representing the browser-side DOM tree has a browse-side leaf node at position A that represents a data element, and a server-side hash tree representing the server-side DOM tree has a server-side leaf node at position B that represents the data element, an asynchrony between the server-side DOM tree corresponding to the difference in position of the respective leaf nodes may be identified by differing identification numbers assigned to the respective leaf nodes. Additionally, or in the alternative, when a browser-side DOM tree and a server-side hash tree are synchronized with one another, each browser-side node in a browser-side hash tree representing the browser-side DOM tree will have a node-value and a node identification number that matches a corresponding node-value and node identification number of a server-side node in a server-side hash tree representing the browser-side DOM tree.

In one example, the numbering convention may include a depth-first search numbering technique. With a depth-first search numbering technique, a unique node identification number is assigned to each node in the hash tree. The depth-first search numbering technique may start with an initial node in the hash tree. The initial node may be the root node. The depth-first search numbering technique may assign a node identification number to the initial node, such as the root node, followed by adjacent nodes until each node in the hash tree has been numbered/renumbered. The unique node identification number assigned to the nodes in the hash tree may represent the order in which the nodes are processed during the depth-first search numbering. The depth-first search numbering technique may number/renumber nodes as deeply as possible before backtracking and numbering/renumbering nodes in other branches of the hash tree. The depth-first search numbering technique assures that all nodes in the hash tree are numbered/renumbered in a systematic manner, thereby revealing relative positions and relationships of the nodes in the hash tree.

In addition, or in the alternative to a depth-first search numbering technique, the numbering convention may include one or more of: a breadth-first search numbering technique, a preorder numbering technique, a post-order numbering technique, a level order numbering technique. A breadth-first search numbering technique may assign a node identification number to each node based on a breadth-first search traversal. With breadth-first search numbering, nodes at the same level may be numbered sequentially before moving to the next level. A preorder numbering technique may assign a unique node identification number to each node based on a preorder traversal. With a preorder traversal, the root node is numbered first, followed by its left subtree, and then its right subtree. A post-order numbering technique may assign a unique node identification number to each node based on a post-order traversal. With a post-order traversal, the left subtree is visited first, then the right subtree, and finally the root node. A level order numbering technique may assign a numerical label to each node based on a level order traversal. With a level order traversal, nodes at each level are visited from left to right before moving to the next level.

In one example, the nodes of a DOM tree, such as a browser-side DOM tree and/or a server-side DOM tree, may be numbered and/or renumbered according to the numbering convention, such as the depth-first search numbering technique. In one example, a node of a DOM tree that corresponds to a node of a hash tree may be identified at least in part by matching the node identification numbers between the hash tree and the DOM tree. The node identification numbers may be used to identify content in a DOM tree for inclusion in an update instruction. For example, when generating an update instruction, the system 100 may navigate to a node in the DOM tree based on a node identification number from a corresponding hash tree. The system may then select the content from the DOM tree at the node having the corresponding node identification number and generate an update instruction based on the content. Additionally, or in the alternative, the node identification numbers may be used to identify a location in a DOM tree for applying an update. For example, when applying an update instruction, the system 100 may identify a node identification number in the update instruction and navigate to a node in the DOM tree based on the node identification number. The system may then apply the update in accordance with the update instruction at the node of the DOM tree identified based on the node identification number. Additionally, or in the alternative, the node identification numbers resulting from the numbering and/or renumbering of a hash tree may be utilized, at least in part, to confirm that a browser-side DOM tree and a server-side DOM tree are synchronous with one another, and/or to identify that a browser-side DOM tree and a server-side DOM tree are asynchronous with respect to one another.

In one example, the browser 114 may assign a browser-side node identification number to each of the plurality of browser-side hash tree-nodes of the browser-side hash tree at least by numbering the plurality of browser-side hash tree-nodes of the browser-side hash tree according to the numbering convention. For at least some of the browser-side hash tree-nodes, the browser 114 may replace a node identification number previously assigned to one or more of the browser-side hash tree-nodes with a new browser-side hash tree-node identification number. Additionally, or in the alternative, the server 104 may assign a server-side node identification number to each of the plurality of server-side hash tree-nodes of the server-side hash tree at least by numbering the plurality of server-side hash tree-nodes of the server-side hash tree according to the numbering convention. For at least some of the server-side hash tree-nodes, the server 104 may replace a node identification number previously assigned to one or more of the server-side hash tree-nodes with a new server-side hash tree-node identification number. When the browser-side hash tree represents a browser-side DOM tree that is synchronized with a server-side DOM tree represented by a server-side hash tree, the browser-side node-value of each browser-side hash tree-node identifiable by a corresponding browser-side node identification number, matches the server-side node-value of a corresponding server-side hash tree-node identifiable by a corresponding server-side node identification number.

E. Example Update Instructions.

The system 100 may generate update instructions for updating a browser-side DOM tree and/or a server-side DOM tree. In one example, the browser 114 executing on the browser device may generate a server-side update instruction and may send the server-side update instruction to the server 104. The server-side update instruction may include one or more node identification numbers that conform to a numbering convention, and a corresponding one or more node operations to be executing on the node identified by a respective node identification number. For example, a server-side update instruction may include a first node identification number corresponding to a first server-side node of the server-side DOM tree, and a first node operation to be executed upon the first server-side node of the server-side DOM tree. Additionally, or in the alternative, the server 104 may generate a browser-side update instruction and may send the browser-side update instruction to the browser 114 executing on the browser device 102. The browser-side update instruction may include one or more node identification numbers that conform to the numbering convention, and a corresponding one or more node operations to be executing on the node identified by a respective node identification number. For example, a browser-side update instruction may include a first node identification number corresponding to a first browser-side node of the browser-side DOM tree, and a first node operation to be executed upon the first browser-side node of the browser-side DOM tree.

E. Data Repositories

Referring further to FIG. 1, the browser data repository 106 may include data associated with the browser device 102 and/or the browser 114. As shown, the browser data repository 106 may include a browser-side DOM tree data corpus 122 and a browser-side hash tree data corpus 124. The browser-side DOM tree data corpus 122 may include one or more browser-side DOM trees and/or data associated with one or more browser-side DOM trees. For example, the browser-side DOM tree data corpus 122 may include various iterations of a browser-side DOM tree resulting from various browser-side updates. Additionally, or in the alternative, the browser-side DOM tree data corpus 122 may include one or more update logs corresponding to respective browser-side DOM trees. The update log may include updates to a browser-side DOM tree corresponding to various browser-side updates and/or browser-side update instructions received from the server 104. Additionally, or in the alternative, the update log may include server-side update instructions computed by the browser 114 and/or sent to the server 104.

The browser-side hash tree data corpus 124 may include one or more browser-side hash trees and/or data associated with one or more browser-side hash trees. For example, the browser-side hash tree data corpus 124 may include one or more iterations of a browser-side hash tree resulting from various browser-side updates. Additionally, or in the alternative, the browser-side hash tree data corpus 124 may include one or more browser-side hash values corresponding to a browser-side hash tree. The browser-side hash values may include root hash values, intermediate hash values, and/or leaf hash values. Additionally, or in the alternative, the browser-side hash tree data corpus 124 may include one or more update logs corresponding to respective browser-side hash tree. The update log may include updates to a browser-side hash tree corresponding to various browser-side updates and/or browser-side update instructions.

In one example, the browser data repository 106 may include one or more browser-side hash values, such as one or more root hash values, relationally associated with a corresponding browser-side hash tree and/or a corresponding browser-side DOM tree represented by the browser-side hash tree. A browser-side hash tree and/or a browser-side DOM tree may be identified by a corresponding browser-side hash value, such as a root hash value. The browser-side DOM tree data corpus 122 and the browser-side hash tree data corpus 124 may represent common or separate portions of the browser data repository 106. Data items in the browser-side DOM tree data corpus 122 may be relationally associated with data items in the browser-side hash tree data corpus 124. The browser-side DOM tree data corpus 122 and the browser-side hash tree data corpus 124 may be updated from time to time, for example, responsive to browser-side update instructions.

In one or more embodiments, the browser data repository 106 may include any type of storage unit and/or device (e.g., a file system, database, collection of tables, or any other storage mechanism) for storing data. Further, the browser data repository 106 may include multiple different storage units and/or devices. The multiple different storage units and/or devices may or may not be of the same type or located at the same physical site. Further, the browser data repository 106 may be implemented or executed on the same computing system as the browser device 102. Additionally, or in the alternative, the browser data repository 106 may be implemented or executed on a computing system separate from the browser device 102.

The server data repository 108 may include data associated with the server 104. As shown, the server data repository 108 may include a server-side DOM tree data corpus 126 and a server-side hash tree data corpus 128. The server-side DOM tree data corpus 126 may include one or more server-side DOM trees and/or data associated with one or more server-side DOM trees. For example, the server-side DOM tree data corpus 126 may include various iterations of a server-side DOM tree resulting from various server-side updates. Additionally, or in the alternative, the server-side DOM tree data corpus 126 may include one or more update logs corresponding to respective server-side DOM trees. The update log may include updates to a server-side DOM tree corresponding to various server-side updates and/or server-side update instructions received from the browser 114 executing on the browser device 102. Additionally, or in the alternative, the update log may include browser-side update instructions computed by the server 104 and/or sent to the browser device 102.

The server-side hash tree data corpus 128 may include one or more server-side hash trees and/or data associated with one or more server-side hash trees. For example, the server-side hash tree data corpus 128 may include one or more iterations of a server-side hash tree resulting from various server-side updates. Additionally, or in the alternative, the server-side hash tree data corpus 128 may include one or more server-side hash values corresponding to a server-side hash tree. The server-side hash values may include root hash values, intermediate hash values, and/or leaf hash values. Additionally, or in the alternative, the server-side hash tree data corpus 128 may include one or more update logs corresponding to respective server-side hash tree. The update log may include updates to a server-side hash tree corresponding to various server-side updates and/or server-side update instructions.

In one example, the server data repository 108 may include one or more server-side hash values, such as one or more root hash values, relationally associated with a corresponding server-side hash tree and/or a corresponding server-side DOM tree represented by the server-side hash tree. A server-side hash tree and/or a server-side DOM tree may be identified by a corresponding server-side hash value, such as a root hash value. The server-side DOM tree data corpus 126 and the server-side hash tree data corpus 128 may represent common or separate portions of the browser data repository 106. Data items in the server-side DOM tree data corpus 126 may be relationally associated with data items in the server-side hash tree data corpus 128. The server-side DOM tree data corpus 126 and the server-side hash tree data corpus 128 may be updated from time to time, for example, responsive to server-side update instructions.

In one or more embodiments, the browser data repository 106 may include any type of storage unit and/or device (e.g., a file system, database, collection of tables, or any other storage mechanism) for storing data. Further, the browser data repository 106 may include multiple different storage units and/or devices. The multiple different storage units and/or devices may or may not be of the same type or located at the same physical site. Further, the browser data repository 106 may be implemented or executed on the same computing system as the browser device 102. Additionally, or in the alternative, the browser data repository 106 may be implemented or executed on a computing system separate from the browser device 102.

The server data repository 108 may further include a content data corpus 130. The content data corpus 130 may include content that may be provided to the browser device 102, for example, for display by the browser 114 on a web page. In one example, the content may include streaming data, such as audio and/or video streaming data. Additionally, or in the alternative, the content data corpus 130 may include web pages, URLs, text files, image files, audio files, video files, or data files, as well as combinations of these. The server 104 may search the content data corpus 130, for example, responsive to a query from the browser 114 executing on the browser device 102.

In one or more embodiments, the server data repository 108 may include any type of storage unit and/or device (e.g., a file system, database, collection of tables, or any other storage mechanism) for storing data. Further, the server data repository 108 may include multiple different storage units and/or devices. The multiple different storage units and/or devices may or may not be of the same type or located at the same physical site. Further, the server data repository 108 may be implemented or executed on the same computing system as the server 104. Additionally, or in the alternative, the server data repository 108 may be implemented or executed on a computing system separate from the server 104.

Referring again to FIG. 1, the system 100 may include a user device interface 132 communicatively coupled or couplable with the browser device 102. The user device interface 132 may include hardware and/or software configured to facilitate interactions between a user and various aspects of the system 100. The user device interface 132 may render user interface elements and receive input via user interface elements. For example, the user device interface 132 may display content from the browser 114, such as one or more web pages and associated content. Additionally, or in the alternative, the user device interface 132 may provide query inputs to the browser 114, such as via a web page displayed by the user device interface 132. The user device interface 132 may further display search results, such as via a web page displayed by the user device interface 132, responsive to a query input. Examples of interfaces include a GUI, a command line interface (CLI), a haptic interface, or a voice command interface. Examples of user interface elements include checkboxes, radio buttons, dropdown lists, list boxes, buttons, toggles, text fields, date and time selectors, command lines, sliders, pages, or forms. Any one or more of these interfaces or interface elements may be utilized by the user device interface 132.

In an embodiment, different components of a user device interface 132 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the user device interface 132 may be specified in one or more other languages, such as Java, C, or C++.

Referring again to FIG. 1, the system 100 may include at least one communications interface 134 communicatively coupled or couplable with the browser device 102 and/or the server 104. Additionally, or in the alternative, the at least one communications interface 134 may be communicatively coupled or couplable with the browser data repository 106 and/or the server data repository 108. The at least one communications interface 134 may include hardware and/or software configured to transmit data between respective components of the system 100 and/or to transmit data to and/or from the system 100. For example, a communications interface 134 may transmit and/or receive data between and/or among at least one of: the browser device 102 and the server 104, the browser device 102 and the browser data repository 106, or the server 104 and the server data repository 108.

In one example, the browser device 102 and/or the server 104 may be respectively implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a browser device.

In one or more embodiments, the system 100 may include more or fewer components than the components described with reference to FIG. 1. The components described with reference to FIG. 1 may be local to or remote from each other. The components described with reference to FIG. 1 may be implemented in software and/or hardware. Each component may be distributed over multiple applications and/or machines. Multiple components may be combined into one application and/or machine. Operations described with respect to one component may instead be performed by another component.

4. EXAMPLE DOM TREE MANAGEMENT OPERATIONS

Referring now to FIGS. 2A-2D, example operations 200 associated with an example system are further described. The operations 200 described with reference to FIGS. 2A-2D may be associated with one or more components of the system. For example, the operations 200 described with reference to FIG. 2A may include operations of a browser device and/or operations of a browser executing on a browser device. Additionally, or in the alternative, the operations 200 described with reference to FIG. 2B may include operations of a server. The operations 200 described with reference to FIGS. 2C and 2D may include operations of a browser and/or operations of a server. One or more operations described with reference to FIGS. 2A-2D may be modified, rearranged, or omitted all together. Accordingly, the particular sequence of operations described with reference to FIGS. 2A-2D should not be construed as limiting the scope of one or more embodiments.

A. Example Browser Operations.

Figure 2A:
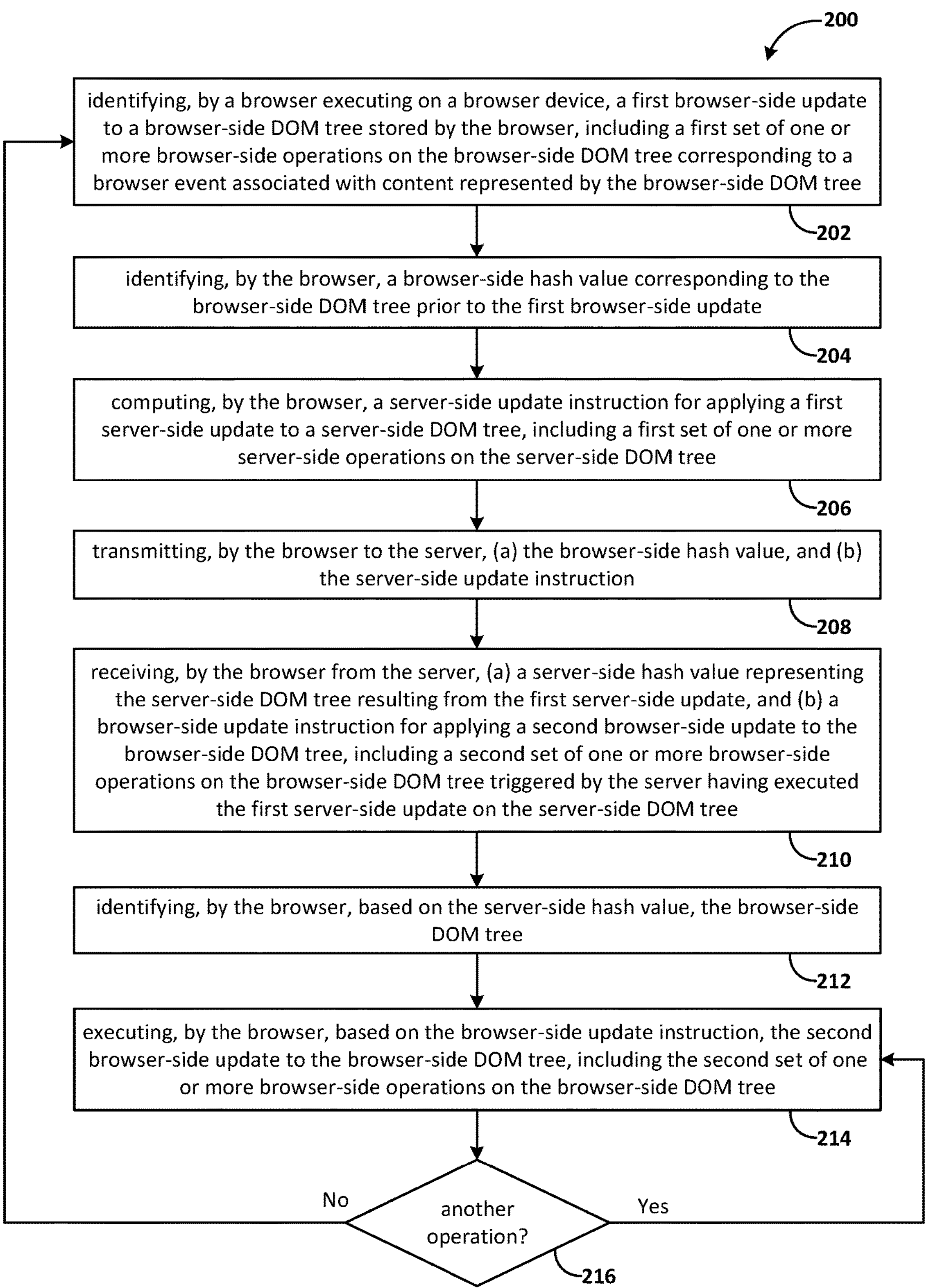
FIG. 2A illustrates example operations of a browser in accordance with one or more embodiments.

As shown in FIG. 2A, example operations 200 may include operations associated with updating a browser-side DOM tree. In one example, the operations 200 may include, at block 202, identifying, by a browser executing on a browser device, a first browser-side update to a browser-side DOM tree stored by the browser. The first browser-side update may include a first set of one or more browser-side operations on the browser-side DOM tree corresponding to a browser event associated with content represented by the browser-side DOM tree. At block 204, the operations may include identifying, by the browser, a browser-side hash value corresponding to the browser-side DOM tree prior to the first browser-side update. The browser-side hash value may be identified in a browser data repository, such as in a browser-side hash tree data corpus. The browser-side hash value may be a root hash value of a browser-side hash tree representing the browser-side DOM tree prior to the first browser-side update. The browser-side hash tree may be generated by the browser and the root hash value of the browser-side hash tree may be selected as the browser-side hash value.

At block 206, the operations 200 may include computing, by the browser, a server-side update instruction for applying a first server-side update to a server-side DOM tree. The server-side update instruction may include a first set of one or more server-side operations on the server-side DOM tree. At block 208, the operations may include transmitting, by the browser to the server, (a) the browser-side hash value, and (b) the server-side update instruction. The browser-side hash value may correspond to a server-side hash value stored by the server in a server data repository. The browser-side hash value may match the server-side hash value. Thus, the server may identify the server-side DOM tree based on the browser-side hash value. Upon identifying the server-side DOM tree, the server may execute the server-side update instruction to apply the first server-side update to the server-side DOM tree. The server-side DOM tree may correspond to the browser-side DOM tree. Upon having executed the server-side update instruction to apply the first server-side update to the server-side DOM tree, the server-side DOM tree may match the browser-side DOM tree resulting from the first browser-side update.

At block 210, the operations 200 may include receiving, by the browser from the server, (a) a server-side hash value representing the server-side DOM tree resulting from the first server-side update, and (b) a browser-side update instruction for applying a second browser-side update to the browser-side DOM tree. At block 212, the operations 200 may include browser identifying the browser-side DOM tree based on the server-side hash value. The browser-side DOM tree identified at block 212 may be the browser-side DOM tree resulting from the first browser-side update. The server-side hash value may be a root hash value of a server-side hash tree. The server-side hash tree may be generated by the server and the root hash value of the server-side hash tree may be selected as the server-side hash value. The server-side hash value may correspond to a browser-side hash value stored by the browser in the browser data repository. In one example, prior to receiving the server-side hash value from the server at block 210, the browser may compute the browser-side hash value that represents the browser-side DOM tree resulting from the first browser-side update. The browser-side hash value representing the browser-side DOM tree resulting from the first browser-side update may match the server-side hash value. Thus, the browser may identify the browser-side DOM tree based on the server-side hash value. For example, the browser-side DOM tree resulting from the first browser-side update may be stored in the browser data repository 106, such as in the browser-side DOM tree data corpus 122. Subsequently, the browser-side DOM tree resulting from the first browser-side update may be retrieved, for example, based on the corresponding server-side hash value, at block 212.

Upon identifying the browser-side DOM tree, at block 214, the operations may include the browser executing, based on the browser-side update instruction, the second browser-side update to the browser-side DOM tree. The browser-side update instruction may include a second set of one or more browser-side operations on the browser-side DOM tree. The browser-side update instruction may be triggered by the server having executed the first server-side update on the server-side DOM tree. For example, the first server-side update on the server-side DOM tree may trigger a second server-side update on the server-side DOM tree, and responsive to the second server-side update, the server may compute the browser-side update instruction for applying the second browser-side update, for example, to synchronize the browser-side DOM tree with the server-side DOM tree following the second server-side update to the server-side DOM tree. Upon having executed the browser-side update instruction to apply the second browser-side update to the browser-side DOM tree, the browser-side DOM tree may match the server-side DOM tree resulting from the second browser-side update.

At block 216, the operations 200 may include determining whether there is another browser-side operation in the browser-side update instruction to be executed on the browser-side DOM tree. When there is another browser-side operation in the browser-side update instruction, the operations 200 may return to block 214, for example, to further execute the browser-side update instruction. When each of the browser-side operations have been executed, the operations 200 may return to block 202, for example, to identify another browser-side update to the browser-side DOM tree corresponding to another browser event associated with content represented by the browser-side DOM tree.

B. Example Server Operations.

Figure 2B:
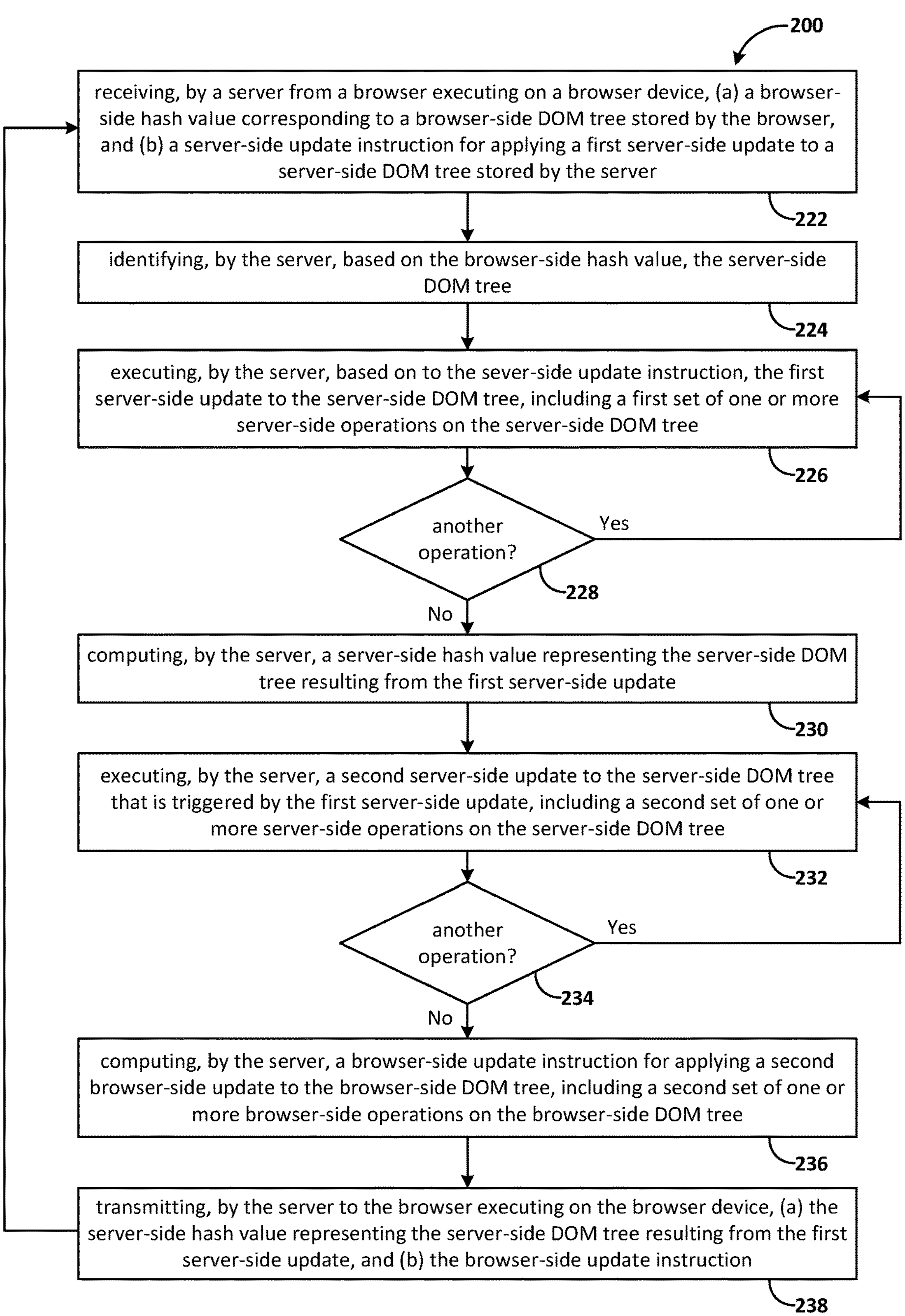
FIG. 2B illustrates example operations of a server in accordance with one or more embodiments.

Referring now to FIG. 2B, the example operations 200 may include operations associated with updating a server-side DOM tree. As shown in FIG. 2B, in one example, the operations 200 may include, at block 222, receiving, by a server from a browser executing on a browser device, (a) a browser-side hash value corresponding to a browser-side DOM tree stored by the browser, and (b) a server-side update instruction for applying a first server-side update to a server-side DOM tree stored by the server. The browser-side hash value may be a root hash value of a browser-side hash tree. The browser-side hash tree may be generated by the browser and the root hash value of the browser-side hash tree may be selected as the browser-side hash value. In one example, the browser-side hash value and the server-side update instruction received by the server may be transmitted to the server by the browser at block 206, as described with reference to FIG. 2A. In one example, the first server-side update may represent an indication of a user interaction with the browser. The first server-side update may be configured to apply one or more updates to the server-side DOM tree to reflect the user interaction with the browser. Additionally, or in the alternative, the first server-side update may represent a content request from the browser.

At block 224, the operations 200 may include the server identifying the server-side DOM tree based on the browser-side hash value. The browser-side hash value may correspond to a server-side hash value stored by the server in a server data repository. The browser-side hash value may match the server-side hash value. Thus, the server may identify the server-side DOM tree based on the browser-side hash value.

Upon identifying the server-side DOM tree, at block 226, the operations 200 may include the server executing, based on the server-side update instruction, the first server-side update to the server-side DOM tree. The server-side update instruction may include a first set of one or more server-side operations on the server-side DOM tree. The server-side update instruction may be triggered by a browser event associated with content represented by the browser-side DOM tree. Responsive to the browser event, the browser may compute the server-side update instruction for applying the server-side update, for example, to synchronize the server-side DOM tree with the browser-side DOM tree following an update to the browser-side DOM tree corresponding to the browser event. The server-side DOM tree may correspond to the browser-side DOM tree. Upon having executed the server-side update instruction to apply the server-side update to the server-side DOM tree, the server-side DOM tree may match the browser-side DOM tree resulting from the update to the browser-side DOM tree corresponding to the browser event.

At block 228, the operations 200 may include determining whether there is another server-side operation in the server-side update instruction to be executed on the server-side DOM tree. When there is another server-side operation in the server-side update instruction, the operations 200 may return to block 226, for example, to further execute the server-side update instruction. When each of the server-side operations have been executed, the operations 200 may proceed to block 230.

At block 230, the operations 200 may include the server computing a server-side hash value representing the server-side DOM tree resulting from the first server-side update. The server-side hash value may be a root hash value of a server-side hash tree representing the server-side DOM tree resulting from the first server-side update. The server-side hash tree may be generated by the server and the root hash value of the server-side hash tree may be selected as the server-side hash value. The server-side hash value computed at block 230 may be utilized to identify the server-side DOM tree resulting from the first server-side update. For example, the server-side DOM tree resulting from the first server-side update may be stored in the server data repository 108, such as in the server-side DOM tree data corpus 126. Subsequently, the server-side DOM tree resulting from the first server-side update may be retrieved based on the corresponding server-side hash value.

At block 232, the operations may include the server executing a second server-side update to the server-side DOM tree. The second server-side update may include a second set of one or more server-side operations on the server-side DOM tree. In one example, the second server-side update may be triggered by the first server-side update. For example, the first server-side update to the server-side DOM tree executed by the server at block 226 may represent a content request from the browser, as applied to the server-side DOM tree, and the second server-side update to the server-side DOM tree executed by the server at block 232 may represent a response to the content request as applied to the server-side DOM tree. The response as applied to the server-side DOM tree may include a change with respect to at least one item of content as represented by the server-side DOM tree.

At block 234, the operations 200 may include determining whether there is another server-side operation in the second server-side update instruction to be executed on the server-side DOM tree. When there is another server-side operation in the server-side update, the operations 200 may return to block 232, for example, to further execute the second server-side update. When each of the server-side operations have been executed, the operations 200 may proceed to block 236.

At block 236, the operations 200 may include the server computing a browser-side update instruction for applying a second browser-side update to the browser-side DOM tree. The browser-side update instruction may include a second set of one or more browser-side operations on the browser-side DOM tree. At block 238, the operations may include the server transmitting, to the browser executing on the browser device. (a) the server-side hash value representing the server-side DOM tree resulting from the first server-side update, and (b) the browser-side update instruction. The server-side hash value may correspond to a browser-side hash value stored by the browser in the browser data repository.

In one example, the second browser-side update to the browser-side DOM tree may represent a response to a content request as applied to the browser-side DOM tree. The response as applied to the browser-side DOM tree may include a change with respect to the at least one item of content as represented by the browser-side DOM tree. For example, the first server-side update to the server-side DOM tree executed by the server at block 226 may represent a content request from the browser, as applied to the server-side DOM tree, and the second server-side update to the server-side DOM tree executed by the server at block 232 may represent a response to the content request as applied to the server-side DOM tree, and the second browser-side update to the browser-side DOM tree may represent a response to a content request as applied to the browser-side DOM tree.

In one example, prior to the server transmitting the server-side hash value to the browser at block 236, the browser may compute the browser-side hash value that represents the browser-side DOM tree resulting from the first browser-side update. The browser-side hash value representing the browser-side DOM tree resulting from the first browser-side update may match the server-side hash value transmitted by the server at block 236. Thus, the browser may identify the browser-side DOM tree based on the server-side hash value. For example, the browser-side DOM tree resulting from the first browser-side update may be stored in the browser data repository 106, such as in the browser-side DOM tree data corpus 122. Subsequently, the browser-side DOM tree resulting from the first browser-side update may be retrieved, for example, based on the corresponding server-side hash value transmitted by the server at block 236.

The server-side hash value transmitted to the browser at block 236 may match the browser-side hash value representing the browser-side DOM tree resulting from the first browser-side update. Thus, the browser may identify the browser-side DOM tree resulting from the first browser-side update based on the server-side hash value transmitted to the browser at block 236. Upon identifying the browser-side DOM tree, the browser may execute the browser-side update instruction to apply the second browser-side update to the browser-side DOM trec. Upon having executed the browser-side update instruction to apply the second server-side update to the browser-side DOM tree, the browser-side DOM tree may match the server-side DOM tree resulting from the second server-side update. In one example, the server-side hash value and the browser-side update instruction transmitted by the server at block 238 may correspond to the server-side hash value and the browser-side update instruction received by the browser at block 210, as described with reference to FIG. 2A.

C. Computing Update Instructions.

Figure 2C:
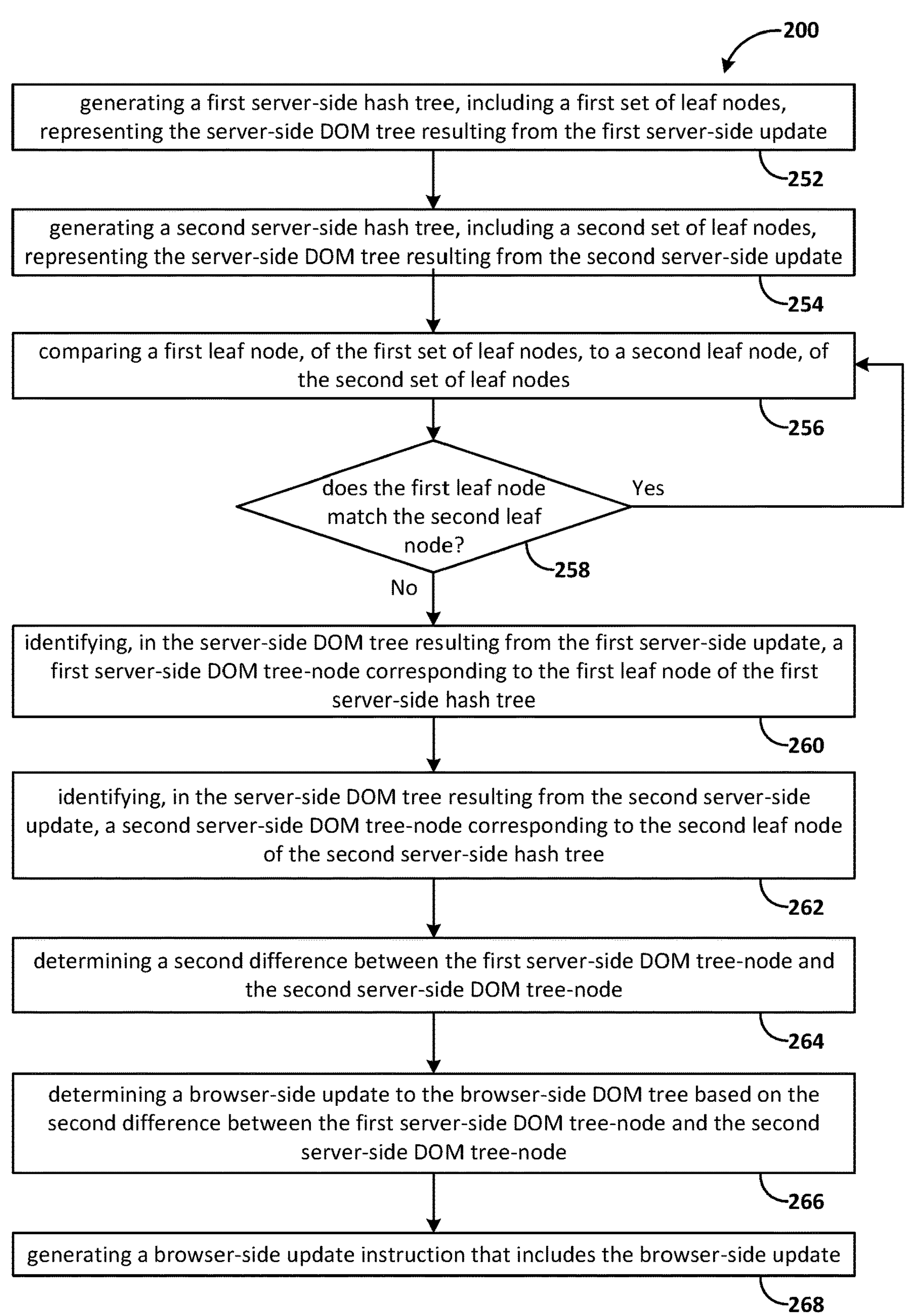
FIG. 2C illustrates example operations associated with computing an update instruction for updating a DOM tree in accordance with one or more embodiments.

As shown in FIG. 2C, example operations 200 may include operations associated with computing an update instruction for updating a DOM tree. The operations shown in FIG. 2C reflect computation of a browser-side update instruction. In one example, the operations described with reference to FIG. 2C may be performed in connection with computing the browser-side update instruction at block 236, as described with reference to FIG. 2B. The browser-side update instruction may be computed by a server and sent to a browser. Upon receiving the browser-side update instruction from the server, the browser may execute the browser-side update instruction to apply one or more browser-side updates to a browser-side DOM tree. Additionally, or in the alternative, it will be appreciated that operations similar to those shown in FIG. 2C may be performed by a browser to compute a server-side update instruction to be send to a server, and that upon receiving a server-side update instruction from the browser, the server may execute the server-side update instruction to apply one or more server-side updates to a server-side DOM tree. For example, the operations described with reference to FIG. 2C may be performed in connection with computing the server-side update instruction at block 206, as described with reference to FIG. 2A.

As shown in FIG. 2C, in one example, the operations 200 may include, at block 252, generating a first server-side hash tree representing a server-side DOM tree resulting from a first server-side update. The first server-side hash tree may include a first set of leaf nodes. At block 254, the operations 200 may include generating a second server-side hash tree representing the server-side DOM tree resulting from a second server-side update. The second server-side hash tree may include a second set of leaf nodes.

At block 256, the operations 200 may include comparing a first leaf node, of the first set of leaf nodes, to a second leaf node, of the second set of leaf nodes. The first leaf node may occupy a first leaf position of the first server-side hash tree, the second leaf node may occupy a second leaf position of the second server-side hash tree, and the first leaf position may correspond to the second leaf position.

At block 258, the operations 200 may include determining whether the first leaf node matches the second leaf node. When the first leaf node matches the second leaf node, the operations 200 may return to block 256, for example, to compare another seat of leaf nodes. When the first leaf node differs from the second leaf node, the operations 200 may proceed to block 260. For example, at block 258, the operations may include determining a first difference between a first leaf node, of the first set of leaf nodes, and a second leaf node, of the second set of leaf nodes. Based on at least the first difference between the first leaf node and the second leaf node, the operations 200 may proceed to block 260.

At block 260, the operations 200 may include identifying, in the server-side DOM tree resulting from the first server-side update, a first server-side DOM tree-node corresponding to the first leaf node of the first server-side hash tree. At block 262, the operations 200 may include identifying, in the server-side DOM tree resulting from the second server-side update, a second server-side DOM tree-node corresponding to the second leaf node of the second server-side hash tree.

At block 264, the operations 200 may include determining a second difference between the first server-side DOM tree-node and the second server-side DOM tree-node. At block 266, the operations 200 may include determining a browser-side update to the browser-side DOM tree based on the second difference between the first server-side DOM tree-node and the second server-side DOM tree-node. At block 268, the operations 200 may include generating a browser-side update instruction that includes the browser-side update.

The browser-side update instruction may include at least a first instruction configured to cause the browser to apply the second browser-side update. In one example, upon the browser having applied the browser-side update to the browser-side DOM tree, a first browser-side DOM tree-node, corresponding to the first server-side DOM tree-node, is modified to match the second server-side DOM tree-node.

Figure 2D:
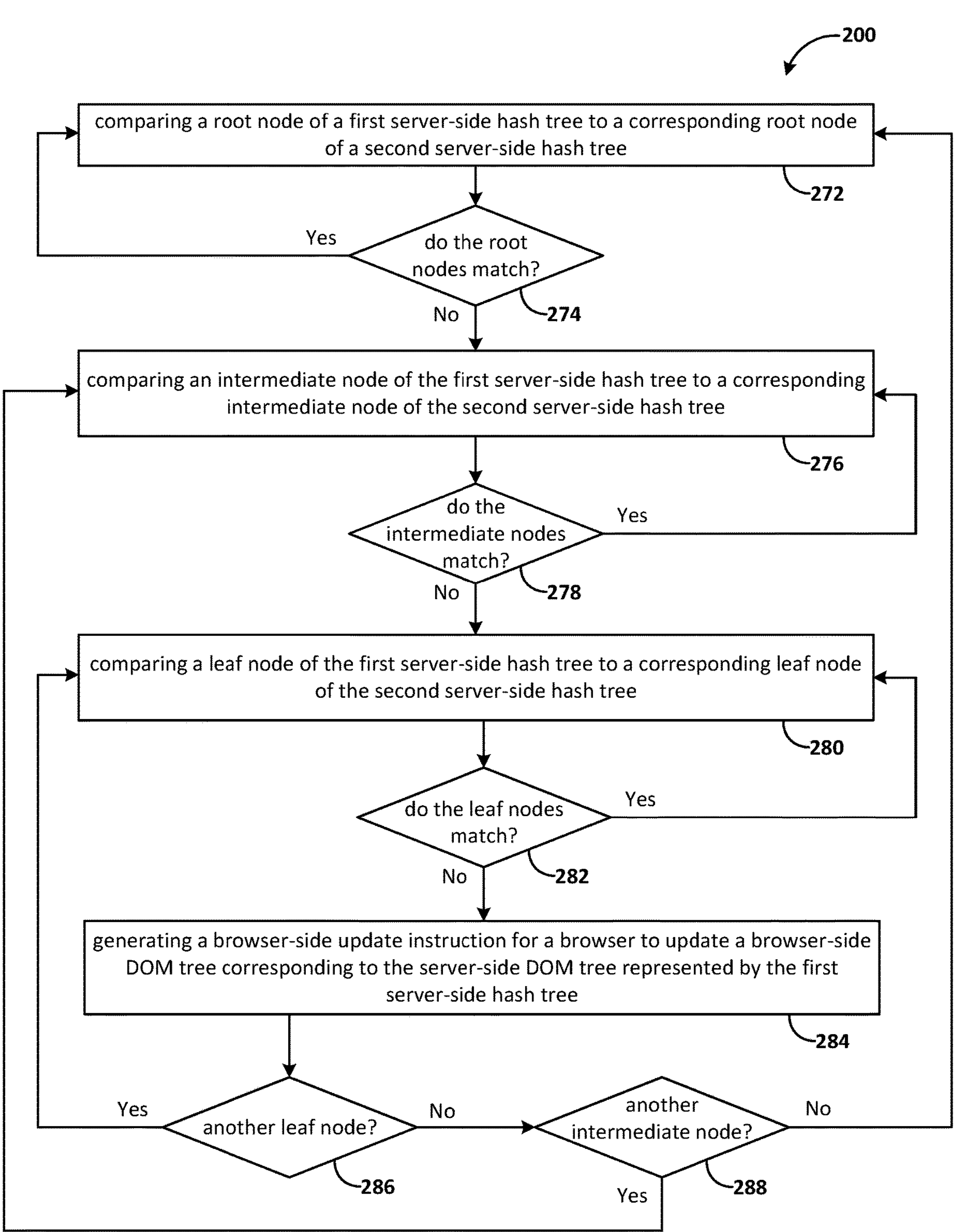
FIG. 2D illustrates example operations associated with determining a difference between hash trees in accordance with one or more embodiments.

Referring now to FIG. 2D, example operations 200 may include operations associated with determining a difference between hash trees, for example, in connection with computing an update instruction for updating a DOM tree, such as described with reference to FIG. 2C. The operations shown in FIG. 2D reflect server-side hash trees, for example, in association with computation of a browser-side update instruction. In one example, the operations described with reference to FIG. 2D may be performed in connection with computing the browser-side update instruction, for example, as described with reference to block 236 of FIG. 2B. Additionally, or in the alternative, it will be appreciated that operations similar to those shown in FIG. 2D may be performed in connection with computing the server-side update instruction, for example, as described with reference to block 206 of FIG. 2A.

In one example, the operations described with reference to FIG. 2D may be performed with respect to a server determining a difference between a first server-side hash tree, representing a server-side DOM tree resulting from a first server-side update, and a second server-side hash tree, representing the server-side DOM tree resulting from a second server-side update. In one example, based on the difference between the first server-side hash tree and the second server-side hash tree, the server may generate a browser-side update instruction for a browser to apply an update a browser-side DOM tree. The server may transmit the browser side update instruction to a browser, and the browser may execute the browser-side update instruction to apply the update to the browser-side DOM tree. In one example, the first server-side hash tree may be the first server-side hash tree described with reference to block 252 of FIG. 2C. In one example, the second server-side hash tree may be the second server-side hash tree described with reference to block 254 of FIG. 2C.

As shown in FIG. 2D, the operations 200 may include, at block 272, comparing a root node of a first server-side hash tree to a corresponding root node of a second server-side hash tree. At block 274, the operations may include determining whether the root node of the first server-side hash tree matches the root node of the second server-side hash tree. When the root nodes match one another, the first server-side hash tree matches the second server-side hash tree. When the root nodes are different from one another, the first server-side hash tree is different from the second server-side hash tree with respect to at least one leaf node and/or at least one intermediate node. When the first root node matches the second root node, the operations 200 may return to block 272, for example, to compare another set of root nodes corresponding to another set of hash trees. When the first root node differs from the second root node, the operations 200 may proceed to block 276, for example, to determine one or more leaf nodes and/or intermediate nodes that differ as between the first server-side hash tree and the second server-side hash tree.

In one example, the first server-side hash tree may include a first server-side root node having a first root node-value, and the second server-side hash tree may include a second server-side root node having a second root node-value. The operations 200 may include, at block 272, comparing the first root node-value of the first server-side root node to the second root node-value of the second server-side root node. At block 274, the operations 200 may include determining that the first root node-value differs from the second root node-value. Based on the first root node-value differing from the second root node-value, the operations 200 may proceed to block 276.

At block 276, the operations 200 may include comparing an intermediate node of the first server-side hash tree to a corresponding intermediate node of the second server-side hash tree. At block 278, the operations 200 may include determining whether the intermediate nodes match one another or whether the intermediate nodes differ from one another. When the intermediate nodes match, the operations 200 may return to block 276, for example, to compare another set of intermediate nodes. When the intermediate nodes differ, the operations may proceed to block 280. Additionally, or in the alternative, when there are no further intermediate nodes, the operations 200 may return to block 272.

In one example, the first server-side hash tree may include at least a first server-side intermediate node and a second server-side intermediate node respectively extending from the first server-side root node. The first server-side intermediate node may have a first intermediate node-value, and the second server-side intermediate node may have a second intermediate node-value. The second server-side hash tree may include at least a third server-side intermediate node and a fourth server-side intermediate node respectively extending from the second server-side root node. The third server-side intermediate node may have a third intermediate node-value, and the fourth server-side intermediate node may have a fourth intermediate node-value. The first server-side intermediate node may occupy a first intermediate position of the first server-side hash tree, and the third server-side intermediate node may occupy a third intermediate position of the second server-side hash tree. The first intermediate position of the first server-side hash tree may correspond to the third intermediate position of the second server-side hash tree. The second server-side intermediate node may occupy a second intermediate position of the first server-side hash tree, and the fourth server-side intermediate node may occupy a fourth intermediate position of the second server-side hash tree. The second intermediate position of the first server-side hash tree may correspond to the fourth intermediate position of the second server-side hash trec.

In one example, at block 276, the operations 200 may include comparing the first intermediate node-value of the first server-side intermediate node to the third intermediate node-value of the third server-side intermediate node, and at block 278, the operations 200 may include determining that the first intermediate node-value matches the third intermediate node-value. Based on the first intermediate node-value matching the third intermediate node-value, the operations 200 may return to block 276.

In one example, the first server-side hash tree and the second server-side hash tree may respectively include one or more lower-level intermediate nodes and/or one or more leaf nodes respectively extending from the first server-side intermediate node and the third server-side intermediate node. Based on the first server-side intermediate node matching the third server-side intermediate node, the operations 200 may include determining that any lower-level intermediate nodes and/or any leaf nodes respectively extending from the first server-side intermediate node and the third server-side intermediate node also respectively match one another. For example, based on the first server-side intermediate node matching the third server-side intermediate node, the operations 200 may omit comparing any lower-level intermediate nodes and/or any leaf nodes respectively extending from the first server-side intermediate node and the third server-side intermediate node.

Upon returning to block 276, the operations 200 may include comparing the second intermediate node-value of the first server-side intermediate node to the fourth intermediate node-value of the fourth server-side intermediate node, and at block 278, determining that the second intermediate node-value differs from the fourth intermediate node-value. Based on the second intermediate node-value differing from the fourth intermediate node-value, the operations may proceed to block 280.

At block 280, the operations 200 may include comparing a leaf node of the first server-side hash tree to a corresponding leaf node of the second server-side hash tree. At block 282, the operations 200 may include determining whether the leaf nodes match one another or whether the leaf nodes differ from one another. When the leaf nodes match, the operations 200 may return to block 280, for example, to compare another set of leaf nodes. When the leaf nodes differ, the operations may proceed to block 284. Additionally, or in the alternative, when there are no further leaf nodes, the operations 200 may return to block 276.

In one example, the first server-side hash tree may include a first server-side leaf node and a second server-side leaf node extending from the second server-side intermediate node. The first server-side leaf node may have a first leaf node-value, and the second server-side leaf node may have a second leaf node-value. The second server-side hash tree may include a third server-side leaf node and a fourth server-side leaf node extending from the fourth server-side intermediate node. The third server-side leaf node may have a third leaf node-value, and the fourth server-side leaf node may have a fourth leaf node-value. The first server-side leaf node may occupy a first leaf position of the first server-side hash tree, and the third server-side leaf node may occupy a third leaf position of the second server-side hash tree. The first leaf position of the first server-side hash tree may correspond to the third leaf position of the second server-side hash tree. The second server-side leaf node may occupy a second leaf position of the first server-side hash tree, and the fourth server-side leaf node may occupy a fourth leaf position of the second server-side hash tree. The second leaf position of the first server-side hash tree may correspond to the fourth leaf position of the second server-side hash trec.

In one example, at block 280, the operations 200 may include comparing the first leaf node-value of the first server-side leaf node to the third leaf node-value of the third server-side leaf node, and at block 282, the operations 200 may include determining that the first leaf node-value matches the third leaf node-value. Based on the first leaf node-value matching the third leaf node-value, the operations 200 may return to block 280.

Upon returning to block 280, the operations 200 may include comparing the second leaf node-value of the second server-side leaf node to the fourth leaf node-value of the fourth server-side leaf node, and at block 282, the operations 200 may include determining that the second leaf node-value differs from the fourth leaf node-value. Based on the second leaf node-value differing from the fourth leaf node-value, the operations 200 may proceed to block 284.

At block 284, the operations 200 may include generating a browser-side update instruction for a browser to update a browser-side DOM tree corresponding to the server-side DOM tree represented by the first server-side hash tree. The browser-side update instruction may include a browser-side update generated based on the difference between a leaf node of the first server-side hash tree and the corresponding leaf node of the second server-side hash tree. Upon having generated the browser-side update instruction, the operations 200 may proceed to block 286. At block 286, the operations 200 may include determining whether there is another leaf node associated with the first server-side hash tree and/or the second server-side hash tree. When there is another leaf node, the operations 200 may return to block 280, for example, to compare another set of leaf nodes. When there are no further leaf nodes, the operations 200 may proceed to block 288. At block 288, the operations 200 may include determining whether there is another intermediate node associated with the first server-side hash tree and/or the second server-side hash tree. When there is another intermediate node, the operations 200 may return to block 276, for example, to compare another set of intermediate nodes. When there are no further intermediate nodes, the operations 200 may return to block 272, for example, to compare another set of root nodes corresponding to another set of hash trees.

In one example, at block 284, the operations 200 may include generating a browser-side update instruction for a browser to apply a browser-side update to a browser-side DOM tree based on the difference between the second leaf node-value of the second server-side leaf node and the fourth leaf node-value of the fourth server-side leaf node. The operations 200 for generating the browser-side update instruction may include one or more of the operations 200 described with reference to FIG. 2C, including, for example, the operations described with reference to blocks 260-268.

4. COMPUTER NETWORKS AND CLOUD NETWORKS

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QOS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets received from the source device are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

5. MICROSERVICE APPLICATIONS

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally, or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

6. HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 3:
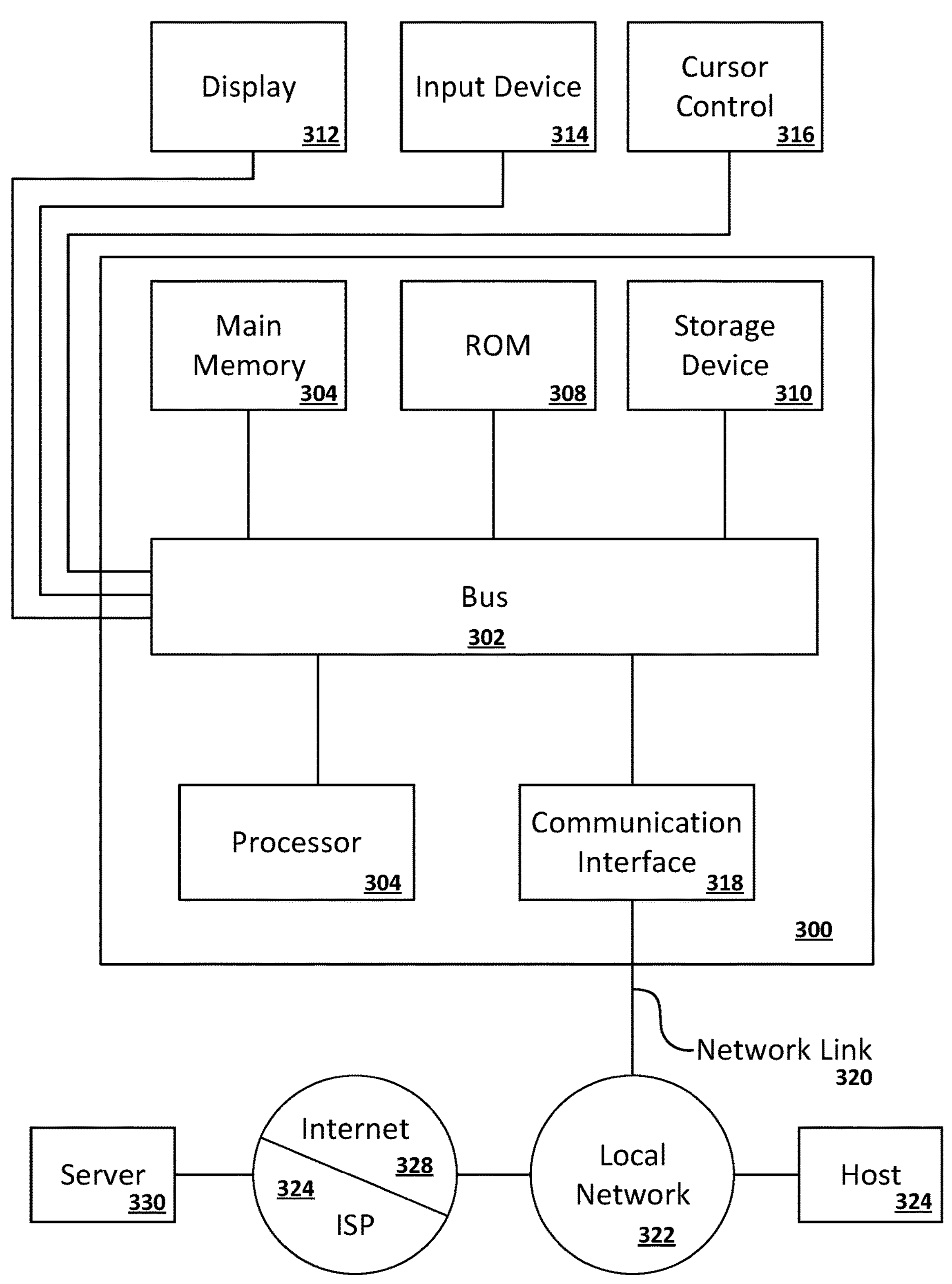
FIG. 3 shows a block diagram that illustrates a computer system in accordance with one or more embodiments.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general-purpose microprocessor.

Computer system 300 also includes a main memory 306, such as a random-access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic, or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world-wide packet data communication network now commonly referred to as the "Internet" 328. Local network 322 and Internet 328 both use electrical, electromagnetic, or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

7. MISCELLANEOUS; EXTENSIONS

Embodiments are directed to a system with one or more devices that include a hardware processor and that are configured to perform any of the operations described herein and/or recited in any of the claims below. In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:

receiving, by a server from a browser executing on a browser device, (a) a server-side update instruction for applying a first server-side update to a server-side DOM tree stored by the server, wherein the first server-side update to the server-side DOM tree reflects a first browser-side update by the browser to a browser-side DOM tree stored by the browser, and (b) a first hash value representing the browser-side DOM tree, the first hash value generated by applying a hash function to a first root node of the browser-side DOM tree prior to the first browser-side update by the browser;

identifying, by the server, based on the first hash value, the server-side DOM tree, wherein identifying the server-side DOM tree comprises:

accessing a data repository comprising a plurality of server-side DOM trees, including the server-side DOM tree, and identifying the server-side DOM tree based on a root hash value of the server-side DOM tree matching the first hash value, wherein the root hash value is computed by the server prior to receiving the first hash value and the server-side update instruction;

executing, by the server, responsive to the server-side update instruction, the first server-side update to the server-side DOM tree, wherein the first server-side update comprises a first set of one or more server-side operations on the server-side DOM tree; and computing, by the server, a second hash value representing the server-side DOM tree resulting from the first server-side update, the second hash value generated by applying the hash function to a second root node of the server-side DOM tree; and storing, by the server, the second hash value in association with the server-side DOM tree resulting from the first server-side update.

2. The media of claim 1, wherein the first server-side update represents an indication of a user interaction with the browser.

3. The media of claim 1, wherein the operations further comprise:

subsequent to the server executing the first server-side update to the server-side DOM tree, numbering a first set of server-side nodes of the server-side DOM tree according to a node numbering convention;

wherein a second set of browser-side nodes of the browser-side DOM tree are numbered according to the node numbering convention; and wherein each of the first set of server-side nodes has a server-side number that matches a browser-side number of a corresponding browser-side node.

4. One or more non-transitory computer-readable media storing instructions, which when executed by one or more hardware processors, cause performance of operations comprising:

receiving, by a server from a browser executing on a browser device, (a) a server-side update instruction for applying a first server-side update to a server-side DOM tree stored by the server, wherein the first server-side update to the server-side DOM tree reflects a first browser-side update by the browser to a browser-side DOM tree stored by the browser, and (b) a first hash value representing the browser-side DOM tree, the first hash value generated by applying a hash function to a first root node of the browser-side DOM tree prior to the first browser-side update by the browser;

identifying, by the server, based on the first hash value, the server-side DOM tree, wherein identifying the server-side DOM tree comprises:

accessing a data repository comprising a plurality of server-side DOM trees, including the server-side DOM tree, and identifying the server-side DOM tree based on a root hash value of the server-side DOM tree matching the first hash value, wherein the root hash value is computed by the server prior to receiving the first hash value and the server-side update instruction;

executing, by the server, responsive to the server-side update instruction, (a) the first server-side update to the server-side DOM tree, wherein the first server-side update comprises a first set of one or more server-side operations on the server-side DOM tree, and (b) a second server-side update to the server-side DOM tree, wherein the second server-side update comprises a second set of one or more server-side operations on the server-side DOM tree, wherein the second server-side update is triggered by the first server-side update;

computing, by the server, a browser-side update instruction for applying a second browser-side update to the browser-side DOM tree, wherein the second browser-side update comprises a second set of one or more browser-side operations on the browser-side DOM tree, wherein the second browser-side update to the browser-side DOM tree reflects the second server-side update to the server-side DOM tree; and transmitting, by the server to the browser executing on the browser device, the browser-side update instruction, wherein, responsive to the browser-side update instruction, the browser executes the second browser-side update to the browser-side DOM tree.

5. The media of claim 4, wherein computing the browser-side update instruction for applying the second browser-side update to the browser-side DOM tree comprises:

generating a first server-side hash tree representing the server-side DOM tree resulting from the first server-side update, wherein the first server-side hash tree comprises a first set of leaf nodes;

generating a second server-side hash tree representing the server-side DOM tree resulting from the second server-side update, wherein the second server-side hash tree comprises a second set of leaf nodes;

determining a first difference between a first leaf node, of the first set of leaf nodes, and a second leaf node, of the second set of leaf nodes, wherein the first leaf node occupies a first leaf position of the first server-side hash tree, wherein the second leaf node occupies a second leaf position of the second server-side hash tree, and wherein the first leaf position corresponds to the second leaf position;

based on the first difference between the first leaf node and the second leaf node:

identifying, in the server-side DOM tree resulting from the first server-side update, a first server-side DOM tree-node corresponding to the first leaf node of the first server-side hash tree, identifying, in the server-side DOM tree resulting from the second server-side update, a second server-side DOM tree-node corresponding to the second leaf node of the second server-side hash tree, determining a second difference between the first server-side DOM tree-node and the second server-side DOM tree-node, determining the second browser-side update to the browser-side DOM tree based on the second difference between the first server-side DOM tree-node and the second server-side DOM tree-node, wherein the browser-side update instruction comprises a first instruction configured to cause the browser to apply the second browser-side update;

wherein upon the browser having applied the second browser-side update to the browser-side DOM tree, a first browser-side DOM tree-node, corresponding to the first server-side DOM tree-node, is modified to match the second server-side DOM tree-node.

6. The media of claim 4, wherein the operations further comprise:

computing, by the server, a second hash value representing the server-side DOM tree resulting from the first server-side update; and transmitting, by the server to the browser executing on the browser device, the second hash value, wherein, the browser identifies the browser-side DOM tree based on the second hash value.

7. The media of claim 6, wherein computing the second hash value comprises:

generating a server-side hash tree representing the server-side DOM tree resulting from the first server-side update;

determining a server-side root hash value of the server-side hash tree; and selecting the server-side root hash value as the second hash value.

8. The media of claim 7, wherein the server-side hash tree comprises a plurality of server-side leaf nodes, and wherein the server-side DOM tree comprises a plurality of server-side DOM tree-nodes, and wherein each of the plurality of server-side leaf nodes comprises a server-side leaf hash value that represents a corresponding server-side DOM tree-node of the plurality of server-side DOM tree-nodes.

9. The media of claim 7, wherein the browser computes a third hash value, representing the browser-side DOM tree resulting from the first browser-side update, at least by:

generating a browser-side hash tree representing the browser-side DOM tree resulting from the first browser-side update;

determining a browser-side root hash value of the browser-side hash tree; and selecting the browser-side root hash value as the third hash value;

wherein the second hash value matches the third hash value; and wherein the browser identifies the browser-side DOM tree based on the second hash value matching the third hash value.

10. The media of claim 9, wherein the server-side hash tree comprises a plurality of server-side hash tree-nodes, wherein each of the plurality of server-side hash tree-nodes comprises a server-side node-value; and wherein the operations further comprise:

assigning a server-side node identification number to each of the plurality of server-side hash tree-nodes of the server-side hash tree at least by numbering the plurality of server-side hash tree-nodes of the server-side hash tree according to a numbering convention, wherein for at least a first server-side hash tree-node of the plurality of server-side hash tree-nodes, a first server-side node identification number assigned to the first server-side hash tree-node replaces a second server-side hash tree-node identification number having been previously assigned to the first server-side hash tree-node;

wherein the browser-side hash tree comprises a plurality of browser-side hash tree-nodes, wherein each of the plurality of browser-side hash tree-nodes comprises a browser-side node identification number having been assigned according to the numbering convention, and a browser-side node-value;

wherein the server-side node-value of each server-side hash tree-node identifiable by a corresponding server-side node identification number, matches the browser-side node-value of a corresponding browser-side hash tree-node identifiable by a corresponding browser-side node identification number.

11. The media of claim 4, wherein the first server-side update to the server-side DOM tree represents a content request from the browser;

wherein the second server-side update to the server-side DOM tree represents a response to the content request as applied to the server-side DOM tree, wherein the response as applied to the server-side DOM tree comprises a change with respect to at least one item of content as represented by the server-side DOM tree; and wherein the second browser-side update to the browser-side DOM tree represents the response to the content request as applied to the browser-side DOM tree, wherein the response as applied to the browser-side DOM tree comprises the change with respect to the at least one item of content as represented by the browser-side DOM tree.

12. The media of claim 4, wherein the first set of one or more server-side operations of the first server-side update comprises:

a first node identification number corresponding to a first server-side node of the server-side DOM tree; and a first node operation to be executed upon the first server-side node of the server-side DOM tree;

wherein the first node identification number corresponds to a node numbering convention applicable to (i) a first set of server-side nodes, including the first server-side node, represented by the server-side DOM tree, and (ii) a second set of browser-side nodes represented by the browser-side DOM tree.

13. The media of claim 4, wherein the operations further comprise:

subsequent to the server executing the first server-side update to the server-side DOM tree, numbering a first set of server-side nodes of the server-side DOM tree according to a node numbering convention;

wherein a second set of browser-side nodes of the browser-side DOM tree are numbered according to the node numbering convention;

wherein each of the first set of server-side nodes has a server-side number that matches a browser-side number of a corresponding browser-side node; and wherein the second set of one or more browser-side operations of the second browser-side update comprises:

a first node identification number corresponding to a first browser-side node of the browser-side DOM tree; and a first node operation to be executed upon the first browser-side node of the browser-side DOM tree.

14. The media of claim 4, wherein computing the browser-side update instruction for applying the second browser-side update to the browser-side DOM tree comprises:

generating a first server-side hash tree representing the server-side DOM tree resulting from the first server-side update, wherein the first server-side hash tree comprises:

a first server-side root node having a first root node-value, a first set of server-side leaf nodes, and at least a first server-side intermediate node and a second server-side intermediate node respectively extending from the first server-side root node, the first server-side intermediate node having a first intermediate node-value, and the second server-side intermediate node having a second intermediate node-value, wherein at least a first server-side leaf node and a second server-side leaf node of the first set of server-side leaf nodes extend from the second server-side intermediate node, the first server-side leaf node having a first leaf node-value, and the second server-side leaf node having a second leaf node-value;

generating a second server-side hash tree representing the server-side DOM tree resulting from the second server-side update, wherein the second server-side hash tree comprises:

a second server-side root node having a second root node-value, a second set of server-side leaf nodes, and at least a third server-side intermediate node and a fourth server-side intermediate node respectively extending from the second server-side root node, the third server-side intermediate node having a third intermediate node-value, and the fourth server-side intermediate node having a fourth intermediate node-value, wherein at least a third server-side leaf node and a fourth server-side leaf node of the second set of server-side leaf nodes extend from the fourth server-side intermediate node, the third server-side leaf node having a third leaf node-value, and the fourth server-side leaf node having a fourth leaf node-value;

comparing the first root node-value of the first server-side root node to the second root node-value of the second server-side root node, and determining that the first root node-value differs from the second root node-value;

based on the first root node-value differing from the second root node-value, comparing the first intermediate node-value of the first server-side intermediate node to the third intermediate node-value of the third server-side intermediate node, and determining that the first intermediate node-value matches the third intermediate node-value, wherein the first server-side intermediate node occupies a first intermediate position of the first server-side hash tree, wherein the third server-side intermediate node occupies a third intermediate position of the second server-side hash tree, and wherein the first intermediate position corresponds to the third intermediate position;

based on the first intermediate node-value matching the third intermediate node-value, comparing the second intermediate node-value of the first server-side intermediate node to the fourth intermediate node-value of the fourth server-side intermediate node, and determining that the second intermediate node-value differs from the fourth intermediate node-value, wherein the second server-side intermediate node occupies a second intermediate position of the first server-side hash tree, wherein the fourth server-side intermediate node occupies a fourth intermediate position of the second server-side hash tree, and wherein the second intermediate position corresponds to the fourth intermediate position;

based on the second intermediate node-value differing from the fourth intermediate node-value, comparing the first leaf node-value of the first server-side leaf node to the third leaf node-value of the third server-side leaf node, and determining that the first leaf node-value matches the third leaf node-value, wherein the first server-side leaf node occupies a first leaf position of the first server-side hash tree, wherein the third server-side leaf node occupies a third leaf position of the second server-side hash tree, and wherein the first leaf position corresponds to the third leaf position;

based on the first leaf node-value matching the third leaf node-value, comparing the second leaf node-value of the second server-side leaf node to the fourth leaf node-value of the fourth server-side leaf node, and determining that the second leaf node-value differs from the fourth leaf node-value, wherein the second server-side leaf node occupies a second leaf position of the first server-side hash tree, wherein the fourth server-side leaf node occupies a fourth leaf position of the second server-side hash tree, and wherein the second leaf position corresponds to the fourth leaf position;

based on the second leaf node-value differing from the fourth leaf node-value:

identifying, in the server-side DOM tree resulting from the first server-side update, a first server-side DOM tree-node corresponding to the second server-side leaf node of the first server-side hash tree, identifying, in the server-side DOM tree resulting from the second server-side update, a second server-side DOM tree-node corresponding to the fourth server-side leaf node of the second server-side hash tree, determining a difference between the first server-side DOM tree-node and the second server-side DOM tree-node, determining the second browser-side update to the browser-side DOM tree based on the difference between the first server-side DOM tree-node and the second server-side DOM tree-node, wherein the browser-side update instruction comprises a first instruction configured to cause the browser to apply the second browser-side update;

wherein upon the browser having applied the second browser-side update to the browser-side DOM tree, a first browser-side DOM tree-node, corresponding to the first server-side DOM tree-node, is modified to match the second server-side DOM tree-node.

15. A method, comprising:

receiving, by a server from a browser executing on a browser device, (a) a server-side update instruction for applying a first server-side update to a server-side DOM tree stored by the server, wherein the first server-side update to the server-side DOM tree reflects a first browser-side update by the browser to a browser-side DOM tree stored by the browser, and (b) a first hash value representing the browser-side DOM tree, the first hash value generated by applying a hash function to a first root node of the browser-side DOM tree prior to the first browser-side update by the browser;

identifying, by the server, based on the first hash value, the server-side DOM tree, wherein identifying the server-side DOM tree comprises:

accessing a data repository comprising a plurality of server-side DOM trees, including the server-side DOM tree, and identifying the server-side DOM tree based on a root hash value of the server-side DOM tree matching the first hash value, wherein the root hash value is computed by the server prior to receiving the first hash value and the server-side update instruction;

executing, by the server, responsive to the server-side update instruction, (a) the first server-side update to the server-side DOM tree, wherein the first server-side update comprises a first set of one or more server-side operations on the server-side DOM tree, and (b) a second server-side update to the server-side DOM tree, wherein the second server-side update comprises a second set of one or more server-side operations on the server-side DOM tree, wherein the second server-side update is triggered by the first server-side update;

computing, by the server, a browser-side update instruction for applying a second browser-side update to the browser-side DOM tree, wherein the second browser-side update comprises a second set of one or more browser-side operations on the browser-side DOM tree, wherein the second browser-side update to the browser-side DOM tree reflects the second server-side update to the server-side DOM tree; and transmitting, by the server to the browser executing on the browser device, the browser-side update instruction, wherein, responsive to the browser-side update instruction, the browser executes the second browser-side update to the browser-side DOM tree;

wherein the method is performed using at least one hardware device.

16. The method of claim 15, wherein computing the browser-side update instruction for applying the second browser-side update to the browser-side DOM tree comprises:

generating a first server-side hash tree representing the server-side DOM tree resulting from the first server-side update, wherein the first server-side hash tree comprises a first set of leaf nodes;

generating a second server-side hash tree representing the server-side DOM tree resulting from the second server-side update, wherein the second server-side hash tree comprises a second set of leaf nodes;

determining a first difference between a first leaf node, of the first set of leaf nodes, and a second leaf node, of the second set of leaf nodes, wherein the first leaf node occupies a first leaf position of the first server-side hash tree, wherein the second leaf node occupies a second leaf position of the second server-side hash tree, and wherein the first leaf position corresponds to the second leaf position;

based on the first difference between the first leaf node and the second leaf node:

identifying, in the server-side DOM tree resulting from the first server-side update, a first server-side DOM tree-node corresponding to the first leaf node of the first server-side hash tree, identifying, in the server-side DOM tree resulting from the second server-side update, a second server-side DOM tree-node corresponding to the second leaf node of the second server-side hash tree, determining a second difference between the first server-side DOM tree-node and the second server-side DOM tree-node, determining the second browser-side update to the browser-side DOM tree based on the second difference between the first server-side DOM tree-node and the second server-side DOM tree-node, wherein the browser-side update instruction comprises a first instruction configured to cause the browser to apply the second browser-side update;

wherein upon the browser having applied the second browser-side update to the browser-side DOM tree, a first browser-side DOM tree-node, corresponding to the first server-side DOM tree-node, is modified to match the second server-side DOM tree-node.

17. The method of claim 15, further comprising:

computing, by the server, a second hash value representing the server-side DOM tree resulting from the first server-side update; and transmitting, by the server to the browser executing on the browser device, the second hash value, wherein, the browser identifies the browser-side DOM tree based on the second hash value.

18. The method of claim 17, wherein computing the second hash value comprises:

generating a server-side hash tree representing the server-side DOM tree resulting from the first server-side update;

determining a server-side root hash value of the server-side hash tree; and selecting the server-side root hash value as the second hash value.

19. The method of claim 18, wherein the server-side hash tree comprises a plurality of server-side leaf nodes, and wherein the server-side DOM tree comprises a plurality of server-side DOM tree-nodes, and wherein each of the plurality of server-side leaf nodes comprises a server-side leaf hash value that represents a corresponding server-side DOM tree-node of the plurality of server-side DOM tree-nodes.

20. The method of claim 18, wherein the browser computes a third hash value, representing the browser-side DOM tree resulting from the first browser-side update, at least by:

generating a browser-side hash tree representing the browser-side DOM tree resulting from the first browser-side update;

determining a browser-side root hash value of the browser-side hash tree; and selecting the browser-side root hash value as the third hash value;

wherein the second hash value matches the third hash value; and wherein the browser identifies the browser-side DOM tree based on the second hash value matching the third hash value.

21. The method of claim 20, wherein the server-side hash tree comprises a plurality of server-side hash tree-nodes, wherein each of the plurality of server-side hash tree-nodes comprises a server-side node-value; and wherein the method further comprises:

assigning a server-side node identification number to each of the plurality of server-side hash tree-nodes of the server-side hash tree at least by numbering the plurality of server-side hash tree-nodes of the server-side hash tree according to a numbering convention, wherein for at least a first server-side hash tree-node of the plurality of server-side hash tree-nodes, a first server-side node identification number assigned to the first server-side hash tree-node replaces a second server-side hash tree-node identification number having been previously assigned to the first server-side hash tree-node;

wherein the browser-side hash tree comprises a plurality of browser-side hash tree-nodes, wherein each of the plurality of browser-side hash tree-nodes comprises a browser-side node identification number having been assigned according to the numbering convention, and a browser-side node-value;

wherein the server-side node-value of each server-side hash tree-node identifiable by a corresponding server-side node identification number, matches the browser-side node-value of a corresponding browser-side hash tree-node identifiable by a corresponding browser-side node identification number.

22. The method of claim 15, wherein the first server-side update to the server-side DOM tree represents a content request from the browser;

wherein the second server-side update to the server-side DOM tree represents a response to the content request as applied to the server-side DOM tree, wherein the response as applied to the server-side DOM tree comprises a change with respect to at least one item of content as represented by the server-side DOM tree; and wherein the second browser-side update to the browser-side DOM tree represents the response to the content request as applied to the browser-side DOM tree, wherein the response as applied to the browser-side DOM tree comprises the change with respect to the at least one item of content as represented by the browser-side DOM tree.

23. The method of claim 15, wherein the first set of one or more server-side operations of the first server-side update comprises:

a first node identification number corresponding to a first server-side node of the server-side DOM tree; and a first node operation to be executed upon the first server-side node of the server-side DOM tree;

wherein the first node identification number corresponds to a node numbering convention applicable to (i) a first set of server-side nodes, including the first server-side node, represented by the server-side DOM tree, and (ii) a second set of browser-side nodes represented by the browser-side DOM tree.

24. The method of claim 15, further comprising:

subsequent to the server executing the first server-side update to the server-side DOM tree, numbering a first set of server-side nodes of the server-side DOM tree according to a node numbering convention;

wherein a second set of browser-side nodes of the browser-side DOM tree are numbered according to the node numbering convention;

wherein each of the first set of server-side nodes has a server-side number that matches a browser-side number of a corresponding browser-side node; and wherein the second set of one or more browser-side operations of the second browser-side update comprises:

a first node identification number corresponding to a first browser-side node of the browser-side DOM tree; and a first node operation to be executed upon the first browser-side node of the browser-side DOM tree.

25. A system, comprising:

at least one hardware processor;

the system being configured to execute operations, using the at least one hardware processor, the operations comprising:

receiving, by a server from a browser executing on a browser device, (a) a server-side update instruction for applying a first server-side update to a server-side DOM tree stored by the server, wherein the first server-side update to the server-side DOM tree reflects a first browser-side update by the browser to a browser-side DOM tree stored by the browser, and (b) a first hash value representing the browser-side DOM tree, the first hash value generated by applying a hash function to a first root node of the browser-side DOM tree prior to the first browser-side update by the browser;

identifying, by the server, based on the first hash value, the server-side DOM tree, wherein identifying the server-side DOM tree comprises:

accessing a data repository comprising a plurality of server-side DOM trees, including the server-side DOM tree, and identifying the server-side DOM tree based on a root hash value of the server-side DOM tree matching the first hash value, wherein the root hash value is computed by the server prior to receiving the first hash value and the server-side update instruction;

executing, by the server, responsive to the server-side update instruction, (a) the first server-side update to the server-side DOM tree, wherein the first server-side update comprises a first set of one or more server-side operations on the server-side DOM tree, and (b) a second server-side update to the server-side DOM tree, wherein the second server-side update comprises a second set of one or more server-side operations on the server-side DOM tree, wherein the second server-side update is triggered by the first server-side update;

computing, by the server, a browser-side update instruction for applying a second browser-side update to the browser-side DOM tree, wherein the second browser-side update comprises a second set of one or more browser-side operations on the browser-side DOM tree, wherein the second browser-side update to the browser-side DOM tree reflects the second server-side update to the server-side DOM tree; and transmitting, by the server to the browser executing on the browser device, the browser-side update instruction, wherein, responsive to the browser-side update instruction, the browser executes the second browser-side update to the browser-side DOM tree.

26. The system of claim 25, wherein computing the browser-side update instruction for applying the second browser-side update to the browser-side DOM tree comprises:

generating a first server-side hash tree representing the server-side DOM tree resulting from the first server-side update, wherein the first server-side hash tree comprises a first set of leaf nodes;

generating a second server-side hash tree representing the server-side DOM tree resulting from the second server-side update, wherein the second server-side hash tree comprises a second set of leaf nodes;

determining a first difference between a first leaf node, of the first set of leaf nodes, and a second leaf node, of the second set of leaf nodes, wherein the first leaf node occupies a first leaf position of the first server-side hash tree, wherein the second leaf node occupies a second leaf position of the second server-side hash tree, and wherein the first leaf position corresponds to the second leaf position;

based on the first difference between the first leaf node and the second leaf node:

identifying, in the server-side DOM tree resulting from the first server-side update, a first server-side DOM tree-node corresponding to the first leaf node of the first server-side hash tree, identifying, in the server-side DOM tree resulting from the second server-side update, a second server-side DOM tree-node corresponding to the second leaf node of the second server-side hash tree, determining a second difference between the first server-side DOM tree-node and the second server-side DOM tree-node, determining the second browser-side update to the browser-side DOM tree based on the second difference between the first server-side DOM tree-node and the second server-side DOM tree-node, wherein the browser-side update instruction comprises a first instruction configured to cause the browser to apply the second browser-side update;

wherein upon the browser having applied the second browser-side update to the browser-side DOM tree, a first browser-side DOM tree-node, corresponding to the first server-side DOM tree-node, is modified to match the second server-side DOM tree-node.

27. The system of claim 25, wherein the operations further comprise:

computing, by the server, a second hash value representing the server-side DOM tree resulting from the first server-side update; and transmitting, by the server to the browser executing on the browser device, the second hash value, wherein, the browser identifies the browser-side DOM tree based on the second hash value.

28. The system of claim 27, wherein computing the second hash value comprises:

generating a server-side hash tree representing the server-side DOM tree resulting from the first server-side update;

determining a server-side root hash value of the server-side hash tree; and selecting the server-side root hash value as the second hash value.

29. The system of claim 28, wherein the server-side hash tree comprises a plurality of server-side leaf nodes, and wherein the server-side DOM tree comprises a plurality of server-side DOM tree-nodes, and wherein each of the plurality of server-side leaf nodes comprises a server-side leaf hash value that represents a corresponding server-side DOM tree-node of the plurality of server-side DOM tree-nodes.

30. The system of claim 28, wherein the browser computes a third hash value, representing the browser-side DOM tree resulting from the first browser-side update, at least by:

generating a browser-side hash tree representing the browser-side DOM tree resulting from the first browser-side update;

determining a browser-side root hash value of the browser-side hash tree; and selecting the browser-side root hash value as the third hash value;

wherein the second hash value matches the third hash value; and wherein the browser identifies the browser-side DOM tree based on the second hash value matching the third hash value.

31. The system of claim 30, wherein the server-side hash tree comprises a plurality of server-side hash tree-nodes, wherein each of the plurality of server-side hash tree-nodes comprises a server-side node-value; and wherein the operations further comprise:

assigning a server-side node identification number to each of the plurality of server-side hash tree-nodes of the server-side hash tree at least by numbering the plurality of server-side hash tree-nodes of the server-side hash tree according to a numbering convention, wherein for at least a first server-side hash tree-node of the plurality of server-side hash tree-nodes, a first server-side node identification number assigned to the first server-side hash tree-node replaces a second server-side hash tree-node identification number having been previously assigned to the first server-side hash tree-node;

wherein the browser-side hash tree comprises a plurality of browser-side hash tree-nodes, wherein each of the plurality of browser-side hash tree-nodes comprises a browser-side node identification number having been assigned according to the numbering convention, and a browser-side node-value;

wherein the server-side node-value of each server-side hash tree-node identifiable by a corresponding server-side node identification number, matches the browser-side node-value of a corresponding browser-side hash tree-node identifiable by a corresponding browser-side node identification number.

32. The system of claim 25, wherein the first server-side update to the server-side DOM tree represents a content request from the browser;

wherein the second server-side update to the server-side DOM tree represents a response to the content request as applied to the server-side DOM tree, wherein the response as applied to the server-side DOM tree comprises a change with respect to at least one item of content as represented by the server-side DOM tree; and wherein the second browser-side update to the browser-side DOM tree represents the response to the content request as applied to the browser-side DOM tree, wherein the response as applied to the browser-side DOM tree comprises the change with respect to the at least one item of content as represented by the browser-side DOM tree.

33. The system of claim 25, wherein the operations further comprise:

subsequent to the server executing the first server-side update to the server-side DOM tree, numbering a first set of server-side nodes of the server-side DOM tree according to a node numbering convention;

wherein a second set of browser-side nodes of the browser-side DOM tree are numbered according to the node numbering convention;

wherein each of the first set of server-side nodes has a server-side number that matches a browser-side number of a corresponding browser-side node; and wherein the second set of one or more browser-side operations of the second browser-side update comprises:

a first node identification number corresponding to a first browser-side node of the browser-side DOM tree; and a first node operation to be executed upon the first browser-side node of the browser-side DOM tree.

* * * * *